United States Patent [19]
Freund

[11] Patent Number: 5,680,618
[45] Date of Patent: Oct. 21, 1997

[54] DRIVER QUERY AND SUBSTITUTION FOR FORMAT INDEPENDENT NATIVE DATA ACCESS

[75] Inventor: Gregor Paul Freund, San Francisco, Calif.

[73] Assignee: Borland International, Inc., Scotts Valley, Calif.

[21] Appl. No.: 561,740

[22] Filed: Nov. 22, 1995

Related U.S. Application Data

[62] Division of Ser. No. 68,722, May 26, 1993.

[51] Int. Cl.[6] ............................................. G06F 17/30
[52] U.S. Cl. .................. 395/616; 395/607; 395/681; 395/682; 395/685; 395/601
[58] Field of Search ........................ 395/600, 155, 395/157, 159, 161, 616, 607, 681, 682, 601, 685

[56] References Cited

U.S. PATENT DOCUMENTS

| | | | |
|---|---|---|---|
| 4,754,428 | 6/1988 | Schultz et al. | 395/275 |
| 4,811,207 | 3/1989 | Hikita et al. | 395/600 |
| 5,210,824 | 5/1993 | Putz et al. | 395/145 |
| 5,212,787 | 5/1993 | Baker et al. | 395/600 |
| 5,226,161 | 7/1993 | Khoyi et al. | 395/650 |
| 5,369,778 | 11/1994 | San Soicie et al. | 395/800 |
| 5,416,917 | 5/1995 | Adair et al. | 395/500 |
| 5,475,836 | 12/1995 | Harris et al. | 395/600 |
| 5,630,076 | 5/1997 | Saulpaugh et al. | 395/284 |

OTHER PUBLICATIONS

Gillespie, "New Standards Promise Open Database Access," *Data Based Advisor*, Dec. 1992, pp. 89–93.
Burgess, "For the Records: Database Spoken Here," *Windows Tech Journal*, Jan. 1993, pp. 271–274.
Udell, "Beyond DOS: Connecting Windows to Data with ODBC," BYTE, Jan. 1993, pp. 271–274.

*Primary Examiner*—Paul R. Lintz
*Attorney, Agent, or Firm*—John A. Smart; David N. Slone

[57] ABSTRACT

A data access system of the present invention includes an interface (client), a data engine having a common application programming interface layer, and data drivers. Through the drivers, the data engine (responding to client requests) accesses foreign data objects, which may include information tables, files, and other data objects of a foreign format. In this manner, the system provides a virtual interface between a client (e.g., database manager) and individual foreign data objects (e.g., database files). Regardless of the format of the individual database files, all files can be shared without the need to make copies.

28 Claims, 11 Drawing Sheets

DRIVER QUERY AND SUBSTITUTION FOR FORMAT INDEPENDENT NATIVE DATA ACCESS

This is a divisional patent application of Ser. No. 08/068,722 filed May. 26, 1993, pending.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to the field of information processing and, more particularly, to database management systems.

Computers are a powerful tool for the acquisition and processing of information. Computerized databases can be regarded as a kind of electronic filing cabinet or repository for collecting computerized data files; they are particularly adept at processing vast amounts of information quickly. As such, these systems serve to maintain information in database files or tables and make that information available on demand.

A "database" is an organized collection of related information or data stored for easy, efficient use. A database is perhaps most conveniently viewed as a stored collection of "records" comprising one or more "fields" of information. Generally, the records are stored in a database file on a storage device. When access to the database is desired, the file, or a subset thereof, is loaded (transferred) from the storage into addressable memory (e.g., random-access memory) where it can be sorted or other manipulated to provide desired lists and reporting capabilities.

Although the term "database file" is generally associated with one of the well-known PC Database Management System (DBMS) file formats (e.g., .DBF file for a dBASE® created file), other data files may function as a database file as that term is used herein. A spreadsheet file, although commonly used for storing financial information, is nonetheless one type of database file. Another database may contain client address information and still other databases may contain product lists and information. Thus, any data object capable of storing an organized collection of related information may be considered as a database file.

Between the actual physical database itself (i.e., the data actually stored on a storage device) and the users of the system, a DBMS is provided as a software cushion or layer. In essence, the DBMS shields the database user from knowing or even caring about underlying hardware-level details. Typically, all requests from users for access to the data are processed by the DBMS. For example, information may be added or removed from data files, information retrieved from or updated in such files, and so forth, all without knowledge of underlying system implementation. In this manner, the DBMS provides users with a conceptual view of the database that is removed from the hardware level.

A database management system is defined as "relational" when it is able to support a relational view of data. This means that data which a user can access and the operators which the user can use to operate upon that data are themselves relational. Data are organized as relations in a mathematical sense, with operators existing to accept relations as input and produce relations as output. Relations are perhaps best interpreted by users as tables, composed of rows (tuples) and columns (attributes).

Relational database management systems include the ability to "link" tables—that is, to establish relationships between tables by linking corresponding fields. In this manner, information from several different tables can be combined in a transparent, useful manner. For instance, a customer invoice (report) may be generated by linking a Customer table comprising Customer No., Name, and Address fields with an Orders table comprising Customer No. and Invoice Price fields; in this instance, the link is effected through the Customer No. fields. The general construction and operation of database management systems, including relational ones, is known in the art. See e.g., Date, C., *An Introduction to Database Systems*, Volume I and II, Addison Wesley, 1990; the disclosures of which are hereby incorporated by reference.

Of particular interest to the present invention are those information processing systems which are operative in a shared fashion, i.e., by multiple users at a given time. A multi-user database implemented on a client/server platform is one such system. Typically, information sharing or connectivity between the users is provided by a network, which comprises several computers connected together as a group. At least one of the PCs functions as a "server," providing network services to "clients" (other computers) on the network. In a typical configuration, the clients or terminals access a central storage location of the server which contains database information. Each terminal may have its own local memory for storing application programs or other information or data. In this manner, valuable resources, such as programs, information tables, memory, disk space, printers, and the like, may be shared by several users.

Inherent in any multi-user computing system is a basic conflict between data integrity and concurrency, i.e., the need to let many users access the same data simultaneously. To ensure data integrity, such a system could allow only one user to use a data table at any given time, but this would be highly inconvenient to other users. On the other hand, the system could allow anyone on a network to use any table at any time. Such unrestricted access, however, would quickly lead to inconsistencies in the data. The need for insuring data integrity, therefore, must be balanced with the need to provide maximum concurrent access. Thus, an important issue in designing any multi-user application is deciding how to resolve simultaneous requests for the same resources.

The need for concurrency control is perhaps most acute in a multi-user database system, where information is frequently or even constantly being updated by several users. Suppose, for example, that two users are both executing an application that reads a particular value from a database, performs a calculation on the value, and writes a new value back to the database. If this process begins concurrently, both users will read the same database value, e.g., three. Suppose the calculation is to increment the database value by one. After both users have finished, the new value stored in the database will be four. However, the correct value desired is five, since each of the two intended to add one to the value of three. Thus, the concurrent actions of two processes have interfered, leaving incorrect data in the database.

Sharing database information from database tables of a single vendor's system has been relatively straightforward.

A "lock manager" is employed for coordinating processes and controlling access to shared resources. With locks, objects (e.g., tables, reports, forms, and other resources) are restricted in such a way that interference problems are minimized or eliminated. This avoids the problem of, say, a user updating an object while another user is viewing it (with its old data). In this manner, multiple users may transparently access the same resources in the same database at the same time, with data integrity fully maintained.

Despite the ease with which database tables of a single-vendor system may be shared, sharing tables created from a variety of vendors is particularly problematic. Since each database vendor utilizes a proprietary file format—one designed for enhancing system performance—tables and data objects of one vendor cannot be directly shared with those of another vendor. Yet in any large corporation, a number of different databases are typically employed for maintaining different types of its information. For instance, the accounting department for such an organization may maintain accounts payable information on a UNIX minicomputer. The shipping department, on the other hand, may employ custom application software, such as a PC DBMS application program. The data of interest may not even reside in a "database" system; a customer table may, for instance, be stored in a spreadsheet data file (e.g., 1-2-3's .WK1 file).

From the user's perspective, such details—ones directed to the physical implementation—are completely irrelevant; the user is interested only in access to needed information. Thus, regardless of the form in which a corporation's information may be maintained, it is highly desirable that such information be readily available to appropriate decisionmakers of the corporation—that the data be readily accessible independent of format or other proprietary considerations.

One approach to sharing data from disparate systems is the process of "importing" and "exporting" data files. Typically, database and other information management systems (e.g., spreadsheets) include an import/export capability which allows the information stored in the database to be converted to and from other formats. Paradox® (ver. 4.0), for instance, includes the ability to import and export data files from 1-2-3®, dBASE®, or Visicalc®, or even ASCII text files.

The process of converting data from one format to another entails several problems. For one, the process is time consuming, and often imported data are not unusable—requiring the wholesale re-input of the data. Even if data were converted without error and in a time-efficient manner, another problem lurks. Specifically, the database manager must generate a copy of the original data with which to work. Thus, if real-time or "live" manipulation of the data in a multi-user environment is desired, the changes made to the copy must somehow be posted back to the original. The use of copies in a multi-user environment of data is unacceptable as uncontrolled use of multiple copies quickly leads to an inconsistent database. And since each copy is of a particular proprietary format (and incompatible with other formats), standard integrity mechanism, such as "locking", cannot be readily employed.

The problem will be further illustrated with the prior art system of FIG. 1. A host computer system 10 includes a database manager or DBMS 21 for accessing a plurality of data tables 23, 25, 27. The data tables or files are stored in a proprietary file format of DBMS 21. Although the tables 23, 25, 27 may be accessible on a shared basis (e.g., across a network), they cannot be directly shared with another database manager. For instance, DBMS 31 is another database manager, operating under another host (host 40), which includes its own proprietary-format tables 33, 35, 37. It cannot directly share the data tables 23, 25, 27 of DBMS 21; nor can DBMS 21 directly share the data tables 33, 35, 37.

To manipulate a table of DBMS 31, DBMS 21 must first make a copy of that table. For example, to access information in table 37, the table is imported or converted to a table 37' which is in a format acceptable to DBMS 21. The operations and commands of DBMS 21 for manipulating information are available for the copy 37', not the original table 37.

A disadvantage of using a copy of database records is the problem of maintaining concurrency between the copy and the original table. If a change to a customer's address is posted to the copy table 37', for example, the table 37' is no longer concurrent with the original table 37. Until the user of the copy exports an updated copy back to the table 37, that user is working with a copy of data which may be outdated.

What is needed is system and methods which allow a plurality of information sources, such as database files, to be accessed and shared by a single host regardless of file format or other proprietary considerations. Moreover, such a system should not require the making of an additional copy of the individual files.

SUMMARY OF THE INVENTION

The invention provides a method and apparatus for accessing foreign data objects (e.g., files of different formats) to be accessed in a shared fashion. Instead of creating a copy of a file, the invention permits access to the original file. This allows all updating of the individual data objects to be done in real time. For instance, when a user updates a portion of a database, that updated portion is immediately available to all users who have access to that database.

A data access system of the present invention includes an interface (client), a data engine having a common API layer, and data drivers. Through the drivers, the data engine (responding to client requests) accesses foreign data objects, which may include information tables, files, and other data objects of a foreign format. In this manner, the system provides a virtual interface between a client (e.g., database manager) and individual foreign data objects (e.g., database files). Regardless of the format of the individual database files, all files can be shared without the need to make copies. In addition, all sorting and reporting capabilities of each database remain intact.

In operation, a user requests data from a particular data object through a familiar client interface. The request is routed through the data engine which invokes the driver module appropriate to the type of data being accessed. In particular, the driver is loaded dynamically (i.e., at the time of request for the object), with data engine callbacks registered in the driver. The desired information is selected and accessed by the user. In this manner, the user can access and manipulate foreign data (not a copy of the data) in real-time, including in multi-user environments. Any changes the user makes are instantly reflected in the native data object.

DETAILED DESCRIPTION OF A PREFERRED EMBODIMENT

The following description will focus on embodiment of the present invention in a multi-user database environment. The present invention is, however, not limited to any particular exemplary embodiment. Instead, the teachings of the present invention may be advantageously applied to a variety of architectures. Application of the present invention is particularly advantageous in those environments requiring access to data of disparate formats, particularly when such access is desired in a shared (e.g., multi-user or multi-tasking) fashion. Therefore, the following preferred embodiment and certain alternatives are offered for purposes of illustration and not limitation.

As used herein, the term "database" refers to any file or collection of files that are used to store an application's data. For example, a spreadsheet file can be considered a database using the present invention. In addition, a database can be a purely virtual object such as data on a remote machine.

General Architecture

Figure 2A:
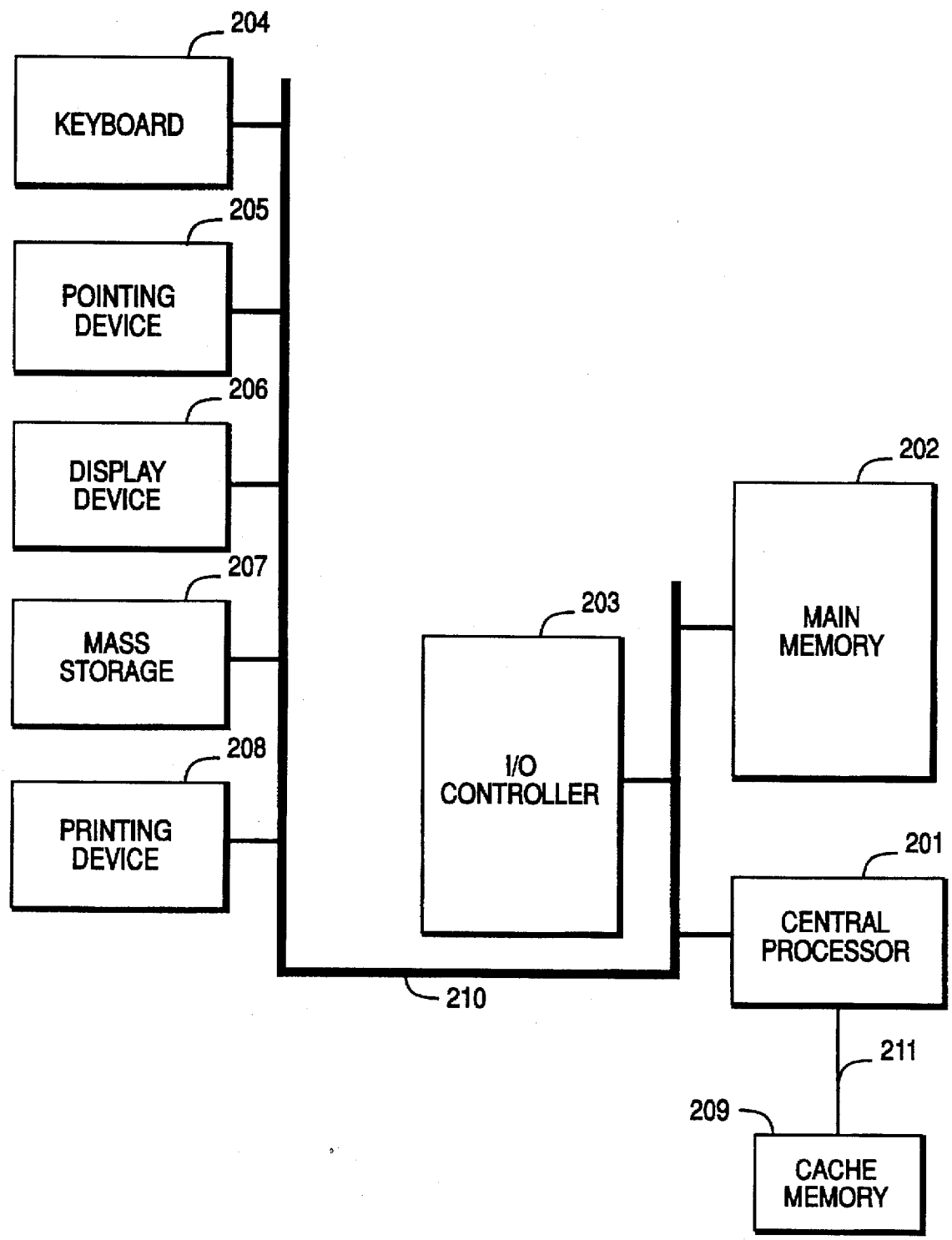
FIG. 2A is a block diagram of a computer system in which the present invention is operative.

The present invention may be embodied on a computer system such as the system 200 of FIG. 2A, which includes a central processor 201, a main memory 202 (e.g., random-access memory or RAM), an input/output controller 203, a keyboard 204, a pointing device 205 (e.g., mouse, track ball, pen device, or the like), a display device 206, and a non-volatile or mass storage 207 (e.g., hard or fixed disk, optical disk, magneto-optical disk, or flash memory). Processor 201 includes or is coupled to a cache memory 209 for storing frequently accessed information; memory 209 may be an on-chip cache or external cache (as shown). System 200 may also be provided with additional input/output devices, such as a printing device 208, as desired. The various components of the system 200 communicate through a system bus 210 or similar architecture, as shown.

Figure 2B:
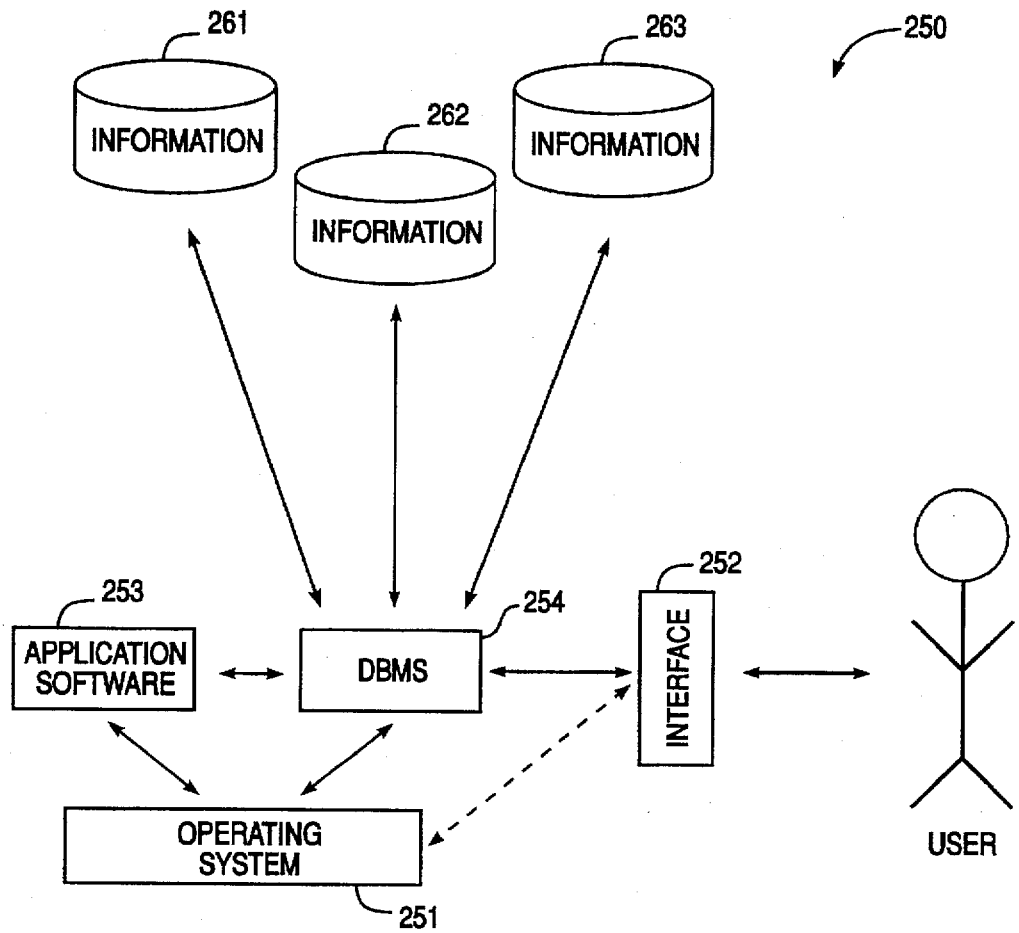
FIG. 2B is a block diagram of a database management system (DBMS) which is operative in the system of FIG. 2A.

Illustrated in FIG. 2B, a computer software system 220 is provided for programming the operation of the computer system 200. Software system 220, which is stored in system memory 202 and on disk memory 207, includes a kernel or operating system 221 and a DBMS 224. OS 221 is the executive or supervisor for the system 200, directing both task management and data management.

DBMS 224, on the other hand, is a software subsystem for storing, retrieving, and manipulating information in database tables (e.g., tables 231, 232, 233). Under the command of DBMS 224, the system 200 receives user commands and data through user interface 222. Interface 222 includes a built-in query surface or editor for accessing and processing database information. Additional application programs, such as DBMS application software 223, may be "loaded" (i.e., transferred from storage 207 into memory 202) for execution by the system 200, particularly for further controlling the operation of DBMS 224.

In a preferred embodiment, the system 200 is an IBM-compatible personal computer system, available from a variety of vendors (including IBM of Armonk, N.Y.), and operating system 221 is MS-DOS operating system software, available from Microsoft of Redmond, Wash. DBMS 224 is preferably a relational database management system (RDBMS). More preferably, DBMS 224 includes Paradox® Database Management System (available from Borland International of Scotts Valley, Calif.). As interface 222, Paradox provides a worksurface or "canvas" and a command menu; a QBE query worksurface is also provided. Application software 223, in turn, include database command-language applications (e.g., PAL™ scripts), which may be executed or otherwise acted upon by the DBMS 224.

Figure 2C:
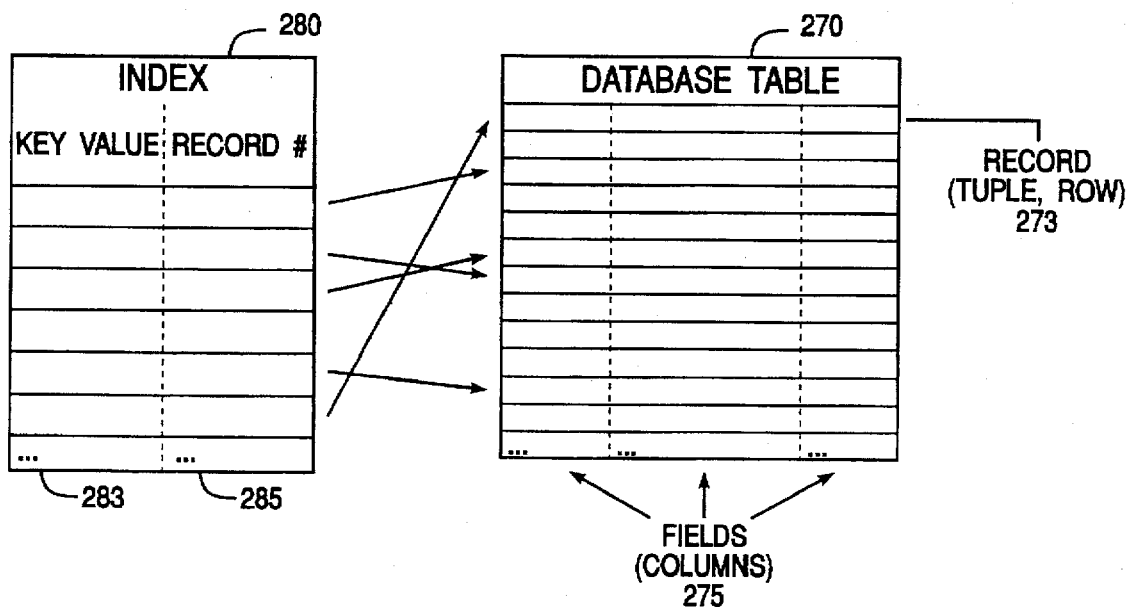
FIG. 2C is a block diagram illustrating a data object (e.g., data base file with supporting index).

At the outset, it is helpful to understand general techniques for storing information in DBMS 224. In a relational database management system, information is organized into tables, such as table 235 of FIG. 2C. As conceptually shown, table 235 typically includes horizontal rows or records (tuples) 238 and vertical columns or fields 240. A database record includes information which is most conveniently represented as a single unit. A record for an employee, for example, may include information about the employee's ID Number, Last Name and First Initial, Position, Date Hired, Social Security Number, and Salary. Thus, a typical record includes several categories of information about an individual person, place, or thing. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed.

By employing one or more database indexes, the records of a table can be organized in many different ways, depending on a particular user's needs. As shown by index 245 of FIG. 2C, for example, an index may be constructed as a single disk file which is referred to internally by the system for locating and displaying records in a database file. Index 245 stores two types of information: index key values 246 and unique record numbers 248. An index key is a data quantity composed of one or more fields from a record; keys are used to arrange (logically) the database file records by some desired order (index expression). Record numbers, on the other hand, are unique pointers to the actual storage location of each record in the database file. In this manner, an index for a database file is similar to the index of a book, which lists subject keys and page numbers that point to where the actual information is located in the book. Specifically, an index organizes (logically not physically) the records in a database file according to the values in one or more fields of interest. As such, an index may greatly speed up searches (queries) for information.

Network Architecture

Figure 2D:
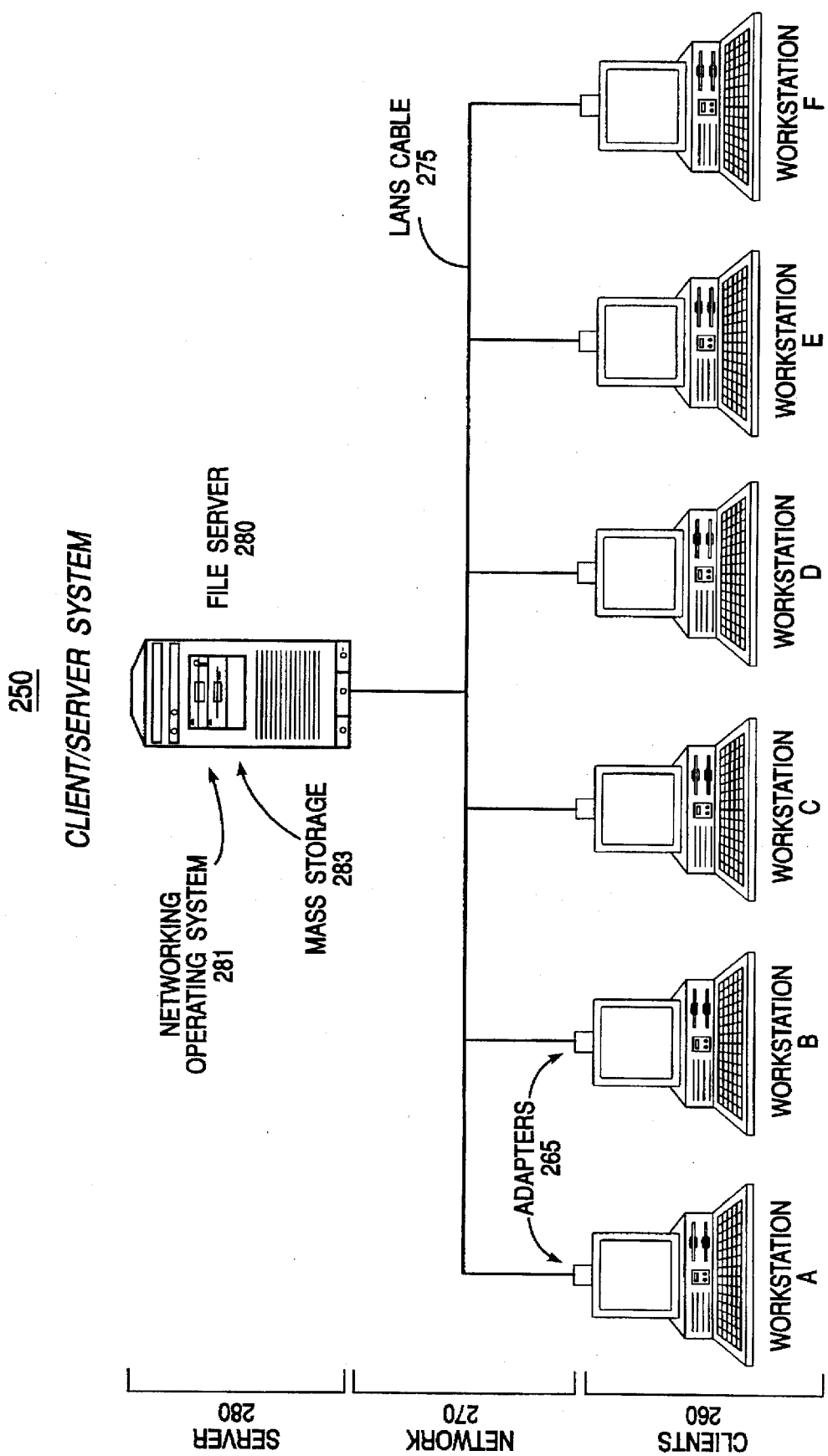
FIG. 2D is a block diagram of a multi-user computing environment, such as a local area network (LAN), in which the present invention may be embodied.

While the present invention is operative within a single (standalone) computer (e.g., system 200 of FIG. 2A), the present invention is preferably embodied in a multi-user computer system, such as the client/server system 250 of FIG. 2D. Specifically, system 250 includes a first computer or file server 280 and one or more second computers or clients 260. In an exemplary embodiment, the clients or workstations 260 are connected to server 280 through a computer network 270, which may be a conventional local area network (LAN). Network 270 includes cabling 275 for connecting the server and each workstation to the network. The workstations themselves will be similar to or the same as system 200; additionally, each typically includes an adapter 265 for receiving the network cable 275. Server 280 may also be similar to or the same as system 200. Because the server manages multiple resources for the clients, it should preferably includes a relatively faster processor, larger mass storage, and more system memory than is found on each workstation.

Overall operation of the system 250 is directed by a networking operating system 281, which may be stored in the server's system memory; in a preferred embodiment, OS 281 includes NetWare®, available from Novell of Provo, Utah In response to requests from the clients 260, the server 280 provides various network resources and services. For instance, multiple users (e.g., workstations A, B, and C) may view a database table stored in file server storage 283, while another user (e.g., workstation E) sends a document to a network printer (not shown). Of particular interest to the present invention is use of system 250 for multi-user database access, which is described next.

Data Engine-based Data Access System

The present invention provides a method and apparatus for accessing data regardless of the format of the database source. The result is a "shared data" system as opposed to a "copied data" system. The shared data system allows multiple users to access original data files and a variety of database file formats.

Figure 3:
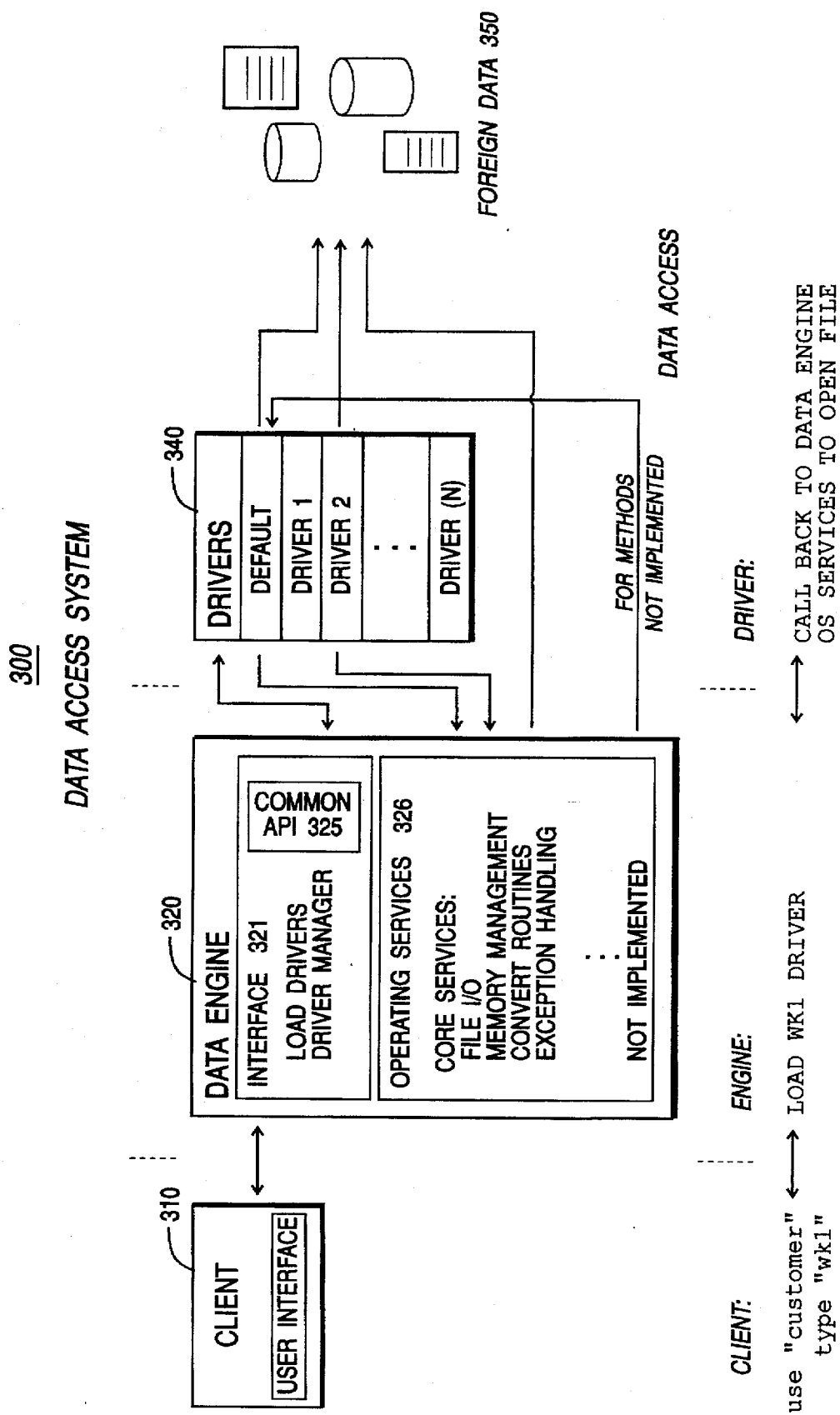
FIG. 3 is a block diagram illustrating a data access system of the present invention.

Shown in FIG. 3, a data access system 300 of the present invention includes a client 310, a data engine 320, and drivers 340. Through the drivers 340, the system accesses foreign data 350, which may include information tables, files, and other data objects of a foreign format. The components of the system 300 will now be described in detail.

A. Client

Client 310 provides the user with a consistent interface—one which is independent of the foreign data sought to be accessed. Without knowing the underlying structure of foreign data 350 or methods for access of that data, the client 310 performs operations of retrieving information, updating information, adding new information, and the like to the foreign data 350.

Preferably, the client 310 provides an interface which is compatible with one already familiar to the user. A user of dBASE®, for instance, would select an Xbase (dBASE-compatible) client. A spreadsheet user, on the other hand, would be more comfortable with a spreadsheet client. In this manner, the client 310 provides a consistent user interface for effecting operations through the data engine 320.

B. Data engine

As shown, the client 310 is operably coupled to the data engine 320. The data engine 320, in turn, functions as a manager of drivers—opening and closing drivers as they are needed for foreign data access. The engine loads one or more drivers from disk, maintaining a count of active drivers. The data engine 320 acts as an interface 321 between the client 310 and the drivers 340. For this purpose, the engine includes a common API 325—an intermediate layer through which the engine may communicate with various drivers.

On the first open operation of foreign data, the data engine locates the most appropriate driver. In this regard, the engine invokes each driver with the data object of interest until an appropriate one is found. When a driver is found, it returns a handle to the desired information. Through the handle, the data engine provides a distribution of calls to the drivers 340 and creates data structures necessary (e.g., calling table and calling vectors) for supporting an instance of a data object (e.g., certain table for a requested cursor).

As shown by the figure, the data engine 320 also includes operating services 326. Specifically, access routines common to data objects may be stored centrally in the data engine 320. In this fashion, a driver need only include functionality for its intended data object which is not supported by the services 326; this greatly simplifies the task of writing individual drivers. Common core services include file I/O, memory management, conversion routines, exception handling, and the like.

C. Drivers

As shown, the data engine 320 is operably coupled to data drivers 340, each of which is specific for accessing a certain type or format of data. Each of the drivers 340 includes data access methods specific for its intended data and is accessible from the data engine through a common Application Programming Interface (API). As shown, the common API layer 325 is (conceptually) interposed between the data engine 320 and drivers 340. Thus from the perspective of the data engine 320, each of the drivers has the same interface (of API 325).

Although a driver includes access methods specific for its intended data, most of the machinery for data access is preferably maintained in the data engine 320, at operating services 326. Specifically, a callback mechanism is provided whereby core services of the data engine may be registered with the drivers. When a driver receives a request for an action, the driver preferably invokes a callback routine in the engine. To open a spreadsheet file, for instance, a spreadsheet (.WK*) driver would satisfy the request, at least in part, by invoking file I/O services of the engine. Only those data-specific services which are not supported by the data engine need be provided by a driver.

In a preferred embodiment, the drivers 340 are implemented as a set of object-oriented classes. In particular, a base class or superclass is provided having default functionality, such as dBASE®, Paradox®, and other desired default compatibility. Each format-specific driver, on the other hand, is implemented as a subclass—adding or overriding methods as is needed to support the intended or target data type. Preferably, drivers should be constructed to provide pure data access, that is, functioning at a low level to support representations of the largest amount of data. Sorting or higher-level functionality, for instance, would be provided at a higher level (e.g., by the client or as an extended function).

Although a driver is typically designed to access a single format of data, a driver may access a species or multiple formats of data. A spreadsheet driver, for example, may access different varieties of spreadsheet formats (e.g., 1-2-3®, Quattro® Pro, Excel®, and the like). Moreover, multiple drivers may be active at any given instance, thus permitting complex interaction among foreign data objects (e.g., a "join" operation performed between a spreadsheet table and a database table).

Common API

The Common API 325 functions as a lingua franca or common language for communicating with foreign data objects. The API 325 defines a number of core database calls usable with all data types and formats. For example, certain databases supported by the present invention, such as text strings or spreadsheets, do not have database indexes. The API calls of the system allow a user to access such a file and perform general operations such as opening and closing the file, going through the file forward or backward, changing data, updating data, and the like.

The Common API also simplifies the task for third party vendors. A vendor need only create a driver which maps the API calls into its particular proprietary format, and only to the extent that the format is not already supported by the default driver.

A. System data members

Before describing an exemplary API in detail, the data structures supported by the API will first be introduced.

USEDATA

The data engine employs an intermediary data structure, USEDATA, to encapsulate information about a foreign data object. When a foreign data objected is opened, a USEDATA data structure is allocated as follows:

are invisible to the data engine. The current record should contain space for an additional field, one byte in length, which follows the data of the last field. This field will contain a record-deleted byte.

CURRENT RECORD LOCATION

The current record location is contained in the urecnum field of the USEDATA Structure. This is a logical value which is defined to be the file location (i.e., record number) that the Current Record is read from when a DbLoad is performed, or stored into when a DbSave is performed.

Loads and stores are permitted to be "lazy." That is, the current record does not need to be read from the database file each time the current record Location is changed (i.e., via DbGoto), but only when a DbLoad operation is performed.

RECORD NUMBERING

Records are numbered from 1 to $2^{32}$. Record numbers are unsigned long integer data type. There may be gaps in the record numbers, i.e., record numbers do not need to be allocated sequentially.

```
unsigned        ufnamesize;      /* 2) size of field name */
unsigned        ufstrucsize;     /* 2) size of field structure */
char            ualias[11];      /* 5) ASCIZZ - 0 if not in use */
char            udbtype[9];      /* 5) ASCIZZ - name of format type */
FIELDDATA       *ufields;        /* 5) field list offset */
unsigned        uinfoflag;       /* 5) information flags about engine */
int             uyear;           /* 5) last update */
char            umonth;
char            uday;
unsigned long   urecsize;        /* 5) size of current Record. */
unsigned long   urecnum;         /* 6) current record number */
unsigned long   ufilfirst;       /* 7) first record # in file */
unsigned long   ufillast;        /* 7) last record # in file */
unsigned long   ufilsize;        /* 7) current # records in file */
char            ubof              /* 3) begin-of-file (Offh=true) */
char            ueof;            /* 3) end-of-file (Offh=true) */
unsigned char   ustatus;         /* 4) use status: */
/*
                                 bit 0 - record dirty bit
                                 bit 1 = file dirty bit
                                 bit 2-bit 15 = reserved for client
*/
unsigned char   umode;           /* 4) last value to dmode */
unsigned char   udelete;         /* 4) deleted: 0 = no
                                              ff = yes * 
char            ureserved[8];    /* reserved for use by the client */
unsigned        uhandle;         /* 5) primary file handle of engine
                                      if available */
char            uengine[34];     /* reserved for use by engine */
```

The USEDATA data structure serves as a communication link between the data object of interest and the system.

In an exemplary embodiment, a USEDATA structure is moveable, that is, it may be moved around in memory by the client at unknown times. Therefore, the only pointer to a USEDATA structure which should be employed is the pointer that is provided as a parameter to a data engine function. In particular, no data structures should be created which contain pointers to USEDATA structures.

CURRENT RECORD

For each open relation there is a Current Record. All record and field operations performed by the host on a given relation are performed on the current record. In particular, the DbLoad and DbSave functions implicitly refer to the current record. Each field of the current record is pointed to by the fddata field in the appropriate fielddata structure of the FIELDDATA array for the given relation.

The client makes no assumptions about the physical structure of the current record. Instead, the client accesses the current record on a field-by-field basis only, by using the pointer to the field contained in fddata of the FIELDDATA structure. The operations of loading and storing field values

FIELDDATA/FIELDDATA ARRAY

The ufields member is a pointer to an array of FIELDDATA which defines the fields of a relation. It is created by DbOpen and DbCreate. The array contains one FIELDDATA structure for each field of the relation. All FIELDDATA structures for the same relation are stored contiguously, and terminated with one extra zero byte. For a relation containing (n) number of fields, for instance, the structures would be stored as:

```
fielddata struct 1
fielddata struct 2
...
fielddata struct (n)
0
```

The FIELDDATA structure itself may be constructed as follows:

```
typedef struct {
    char            fdtype;
    char            *fddata;
    unsigned char   fdlen;
    unsigned char   fddec;
    char            fdreserved[2];
    unsigned        fdstat;
    unsigned char   fdnlen;
    char            fdname;
} FIELDDATA;
``` where fdtype contains the field type and must be one of 'C', 'N', 'D', 'L', 'M', or 0; fddata points to the field's data in the current record; fdlen is the length of the field's data; fddec is the number of decimals in numeric data; fdreserved is reserved for future use; fdstat contains status information about the field, with Bit 0=field dirty bit and Bits 1 to 15 are reserved for the host; fdnlen is the fieldname length; and fdname is the first byte of the field name. The fieldname is stored contiguously from here.

Because fieldname's lengths vary from application to application the FIELDDATA structure is a variable size structure. Its exact size is given in ufnamesize. The total size of the FIELDDATA structure is given by ufstrucsize. This allows an application to store additional information in the FIELDDATA structure.

B. API calls

In an exemplary embodiment, the following database calls may be provided setup and management of a data access session.

| | |
|---|---|
| DBInit | Initializes the database engine |
| DBExit | Shuts down the database engine |
| DBOpen | Opens an existing database |
| DBCreate | Creates and opens a database |
| DBExist | Tests for the existence of a database |
| DBName | Returns the name of the database |
| DBClose | Closes a database |
| DBClose DEL | Deletes the database file or files |
| DBGoto | Seeks to a particular record using record number |
| DBGotokey | Seeks to a particular record using the primary key |
| DBTop | Seeks to the first record |
| DBBottom | Seeks to the last record |
| DBEof | Seeks to end of file |
| DBSkip | Seeks relatively |
| DBMode | Sets the current access mode (sequential forward, backward or random access) |
| DBLoad | Loads a record from the database |
| DBSave | Saves a record into the database |
| DBAppend | Appends record at the and of the database |
| DBFree | Deletes and frees the space used by a record |
| DBAlloc | Allocates space for a new record |

Each will now be described in greater detail.

DbInit initializes the engine environment, such as the current working directory. It is called once just after the engine is loaded. A suitable function prototype for the call is:

int pascal DbInit (void);

where the function returns a value of 0 for success and otherwise returns an error code.

DbExit, which is called once just before the engine is unloaded, shuts down the database engine. A suitable function prototype for the call is:

int pascal DbExit (void);

where the function returns a value of 0 for success and otherwise returns an error code.

DbOpen opens an existing database file. It may be prototyped as:

int pascal DbOpen (USEDATA*ud, char**filename);

As shown, DbOpen is called with a pointer to a USEDATA structure and with a pointer to the filename of the desired target data (the filename being passed as a null-terminated or asciiz string).

An exemplary use of the call is:

int     result;
    USEDATA ud;
    char    *filename = "employees";
    result = DbOpen( &ud, &filename );

Here, DbOpen initializes the USEDATA and allocates and initializes FIELDDATA and the Current Record. Most of the USEDATA is initialized to 0 before DbOpen is called. ufnamesize contains the length of fieldnames in the FIELDDATA structure. The ufstrucsize member contains the actual size of the FIELDDATA structure. The underlying data file is also opened and all initializations required for subsequent calls to the database engine are performed. The function constructs the FIELDDATA array; allocates space for the current record; sets ualias to the name of the database (without path and extension); sets udbtype to the name of the database type; sets ufields to point to the FIELDDATA array; sets uldate to the date of the last update to the database; sets urecsize to the size of the current record; sets urecnum to the current record; sets ufilfirst to the first record in database; sets ufillast to the last record in database; sets ufilsize to the number of records in a database; sets uhandle to the database file handle (if relevant); sets uengine—a 32 byte work area that is used by the database engine (the area can be initialized with any information that will be required on subsequent database engine function calls); and updates the filename pointer.

DbOpen takes data type conversion into account when creating FIELDDATA and chooses the best matched conversion between the database and the host. If any operation fails (e.g., cannot open file, or cannot allocate required memory), then DbOpen will undo those operations that have been completed (e.g., successful memory allocation). The function returns 0 if successful, otherwise an error number is returned. Some errors with DbOpen include (1) target file not found; (2) file not a FOREIGN database file; and (3) insufficient system memory.

DbCreate creates and opens a data object. It may be prototyped as:

int pascal DbCreate( USEDATA *ud,
                         char **filename,
                         FIELDDATA *fd );

For instance, it may be used as follows.

int result;
    USEDATA ud;
    char *filename = "employees";
    /*
    Create a field to define two fields:
        the first is a 20 character field named "field A",
        the second is a numeric field named "field B".
    Terminate the field list with an empty field def beginning with a 0.
    */

-continued

```
char field1[20];
char field2[8];
FIELDDATA fd[3] = {
        'C', field1, 20, 0, 0, 0, 7, "FIELD_A",
        'N', field2, 8, 2, 0, 0, 0, 7, "FIELD_B",
        0
};
result = DbCreate( &ud, &filename, &fieldlist );
```

DbCreate is similar to DbOpen, except that it is called with the name of a database file which it will create. DbCreate creates all data structures analogously to DbOpen. In a typical implementation, a DbCreate call will just create a database file and then use DbOpen to open it. Also, it is called with a pointer to a FIELDDATA array which defines the fields of the new database. The FIELDDATA array that is passed to DbCreate should preferably not be used to initialize USEDATA structure. A new FIELDDATA array should be allocated and the values copied from the passed array to the new array, because the database engine does not know how the passed FIELDDATA array was allocated.

DbCreate is invoked with a pointer to a USEDATA structure, a pointer to a null-terminated text string containing the target file name, and a pointer to a FIELDDATA array which defines the fields of the new database. The function returns 0 if successful, otherwise it returns an error number. Errors include, for example, "file already exists" or "insufficient memory."

DbExist tests whether a database file exists. The prototype for DbExist is:

```
int pascal DbExist(USEDATA*ud, char**filename);
```

An exemplary use of the function is:

```
int result;
USEDATA ud;
char *filename = "employee";
result = DbExist( &ud, &filename );
```

As shown, the function is called with a pointer to a USEDATA structure and with a pointer to a null-terminated text string containing a file name. The function returns 0 if the file exists, otherwise an error number is returned. If the file exists then the filename pointer is incremented to the end of the string. File does not exist in the error return.

DbClose closes a database file, frees all data structures associated with the file, and performs any additional cleanup required. An exemplary prototype for the call is:

```
int pascal DbClose(USEDATA*ud);
```

An exemplary use of the function includes:

```
int result;
USEDATA ud;
result = DbClose( &ud );
```

As shown, DbClose is called with a pointer to a USEDATA structure. The call returns 0 if successful, otherwise an error number (e.g., for "disk full") is returned.

DbGoto, DbSkip, DbTop, DbBottom, DbEof are calls which update the current record number in USEDATA, indicating a new record position in database file. Each may be respectively prototyped as follows:

```
int pascal DbGoto(USEDATA *u, unsigned long recNum,
        unsigned *flag );
int pascal DbSkip( USEDATA *u, long num, unsigned *flag );
int pascal DbTop( USEDATA *u, unsigned *flag );
int pascal DbBottom( USEDATA *u, unsigned *flag );
int pascal DbEof( USEDATA *u, unsigned *flag );
```

An example use, such as for DbGoto, includes:

```
int result;
int flag;
USEDATA ud;
result = DbGoto( &ud, 10L, &flag );
```

Each call is invoked with a pointer to a USEDATA structure and a flag to return (DB_EOF, DB_BOF, 0). DbGoto includes an additional "recNum" parameter for specifying a desired record number to navigate to; DbSkip includes a "num" parameter for specifying a skip number, that is, a number of records to skip.

In operation, these calls seek to the desired record number, and return a value (e.g., in a flag) indicating whether the new position is at beginning of file, end of file, neither or both. The database engine does not load data on a DbGoto call and does not necessarily have to perform the seek at this time (i.e., "lazy seeking"—deferring the seek until a DbLoad, DbSave or DbAppend call). DbSkip is the same as DbGoto except that the seek is relative to the current position. The Skip can be positive or negative. DbTop is the equivalent to DbGoto(&u, u.ufilfirst, &flag ).

DbBottom is equivalent to DbGoto(&u, u.ufillast, &flag). DbEof is equivalent to DbGoto(&u, u.ufillast+1, &flag ). Record numbers do not have to be sequential; there can be holes in the database. If a database contains records 1, 2, 3, 5, 7 and the current record number is 2 then a DbSkip(&u, 3, &flag) will seek to record 7. By way of example, the following exemplary implementation of DbGoto is suitable for databases without holes and lazy seeking:

```
int pascal DbGoto (USEDATA *u, unsigned long recNum,
        unsigned *flag)
{
        unsigned result;
        if ( u→ufilsize == 0) {
                u→urecnum u→ufilfirst;
                result = DB_EOF | DB_BOF;
        }
        else if ( recNum > u→ufillast ) {
                u→urecnum = u→ufillast + 1;
                result = DB_EOF;
        }
        else if ( recNum >u→ufilfirst ) {
                u→urecnum = u→ufilfirst;
                result = DB_BOF;
        }
        else {
                u→urecnum = recNum;
                result = 0;
        }
        *flag = result;
        return 0;
}
```

DbMode tells the database engine what kind of database accesses to expect, i.e., sequential forward, sequential backward, or random. DbMode allows the database engine to make a note, for its internal purposes, of what kind of database accesses can be expected in the immediate future.

The database engine can alter its buffering strategy accordingly. An exemplary prototype for the call is:

```
int pascal DbMode(USEDATA *d, unsigned mode);
```

An exemplary use of the function includes:

```
DbMode(d, RANDOM_ACCESS);
```

As shown, DbMode is called with a pointer to a USEDATA structure and a specified mode. In an exemplary embodiment, Mode may be defined as:

```
Mode  0 = FORWARD_ACCESS (default)
      1 = BACKWARDS_ACCESS
      8 = RANDOM_ACCESS
```

DbLoad inputs the Current Record from the record number of the database file (given by usedata.urecnum). The call converts data types from foreign types to the best host equivalents. An exemplary prototype for the call is:

```
int pascal DbLoad(USEDATA *ud);
```

An exemplary use of the function includes:

```
int result;
USEDATA ud;
result = DbLoad( &ud );
```

As shown, DbLoad is called with a pointer to a usedata structure.

DbSave, the counterpart to DbLoad, writes the current record to the database file at the urecnum. An exemplary prototype for the call is:

```
int pascal DbSave(USEDATA *ud);
```

An exemplary use of the function includes:

```
int result;
USEDATA ud;
result = DbSave( &ud);
```

The call writes the current record to the database file at the location record number location (given by usedata.urecnum). It converts host data types to their foreign equivalent values in the underlying database system. If the database file supports the deleted records then ud.udelete recorded in the database along with the current record. DbSave can only be used to save existing records. It can not be used to add new records to the file. DbSave is called with a pointer to a USEDATA structure.

DbAppend appends the Current Record to the end of the database file. DbAppend resembles DbSave, except that it adds new records to the database. In an exemplary implementation, DbEof is called before calling DbAppend. DbAppend will adjust ud.ufilsize. An exemplary prototype for the call is:

```
int pascal DbAppend(USEDATA *ud);
```

An exemplary use of the function includes:

```
int result;
USEDATA ud;
result = DbAppend( &ud );
```

As shown, DbAppend is called with a pointer to a USEDATA structure.

DbTruncate truncates a database file at a given record number. An exemplary prototype for the call is:

```
int pascal DbTruncate(USEDATA *ud, long recnum);
```

An exemplary use of the function includes:

```
int result;
USEDATA ud;
result = DbTruncate( &ud, 100L );
```

As shown, the function receives a pointer to a USEDATA structure and a record number. In turn, it updates ud.ufilsize to the new value of number of records in file; the current record number (i.e., usedata.urecnum) is not updated. If successful, the call returns 0; otherwise an error number (e.g., for "record out of range") is returned.

Error Handling considerations

As described above, the data engine reports error conditions which it encounters by means of the error number returned as the function result. These include errors returned by calls to host services, which the data engine propagates back to the client. In cases where it is inconvenient to return an error code (e.g., the data engine is deeply nested in functions), a special error call (DbError) may be invoked to return the error code and control back to the client.

Data engine assumes responsible for proper clean up when errors occur. An operation must either succeed entirely or the database is left in its state just prior to the call to the data engine. Operations are atomic in a transaction processing sense. Operations either succeed or fail. If they succeed, the state of the database may be altered. If they fail, the state of the database is unchanged. The data engine should track what of its current state (e.g., what data structures have been allocated, what files have been opened, and the like) in order to correctly handle a DbClose (or possibly a DbCleanUp) operation.

Method of Data Access with Dynamically-loaded Drivers

Figure 4:
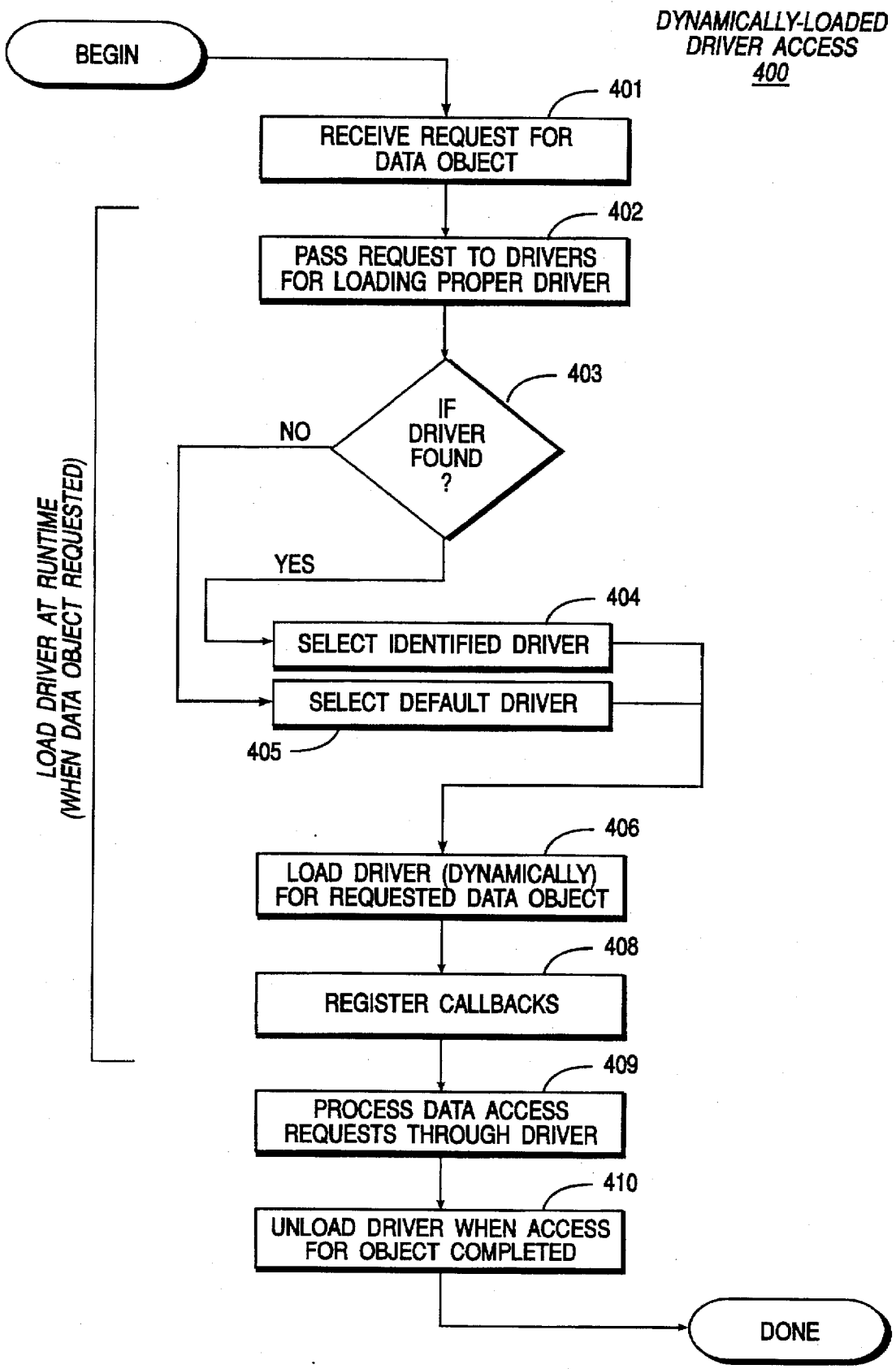
FIG. 4 is a flowchart illustrating a method of the present invention for data access with dynamically-loaded drivers.

Referring now to FIG. 4, a method 400 of the present invention for data access with dynamically-loaded drivers is illustrated. The method proceeds as follows. At step 401, the method receives a request for a data object of interest. At step 402, the request is passed to the drivers. At step 403, if a particular driver is found which is appropriate for accessing the data object, then that driver is selected at step 404. Otherwise (no at step 403), the method will proceed to select the default driver as the preferred driver for processing the data object at step 405.

At step 406, the selected driver is loaded (into system memory). At step 408, the data engine registers callbacks (pointer to functions within the data engine) with the loaded driver, so that the driver may invoke desired services of the data engine. At step 409, the method processes data access requests (e.g., for information retrieval, sorting, and the like)

through the driver. At step 410, the driver is removed from system memory when the foreign data object(s) is no longer of interest (i.e., all operations completed).

Figure 5:
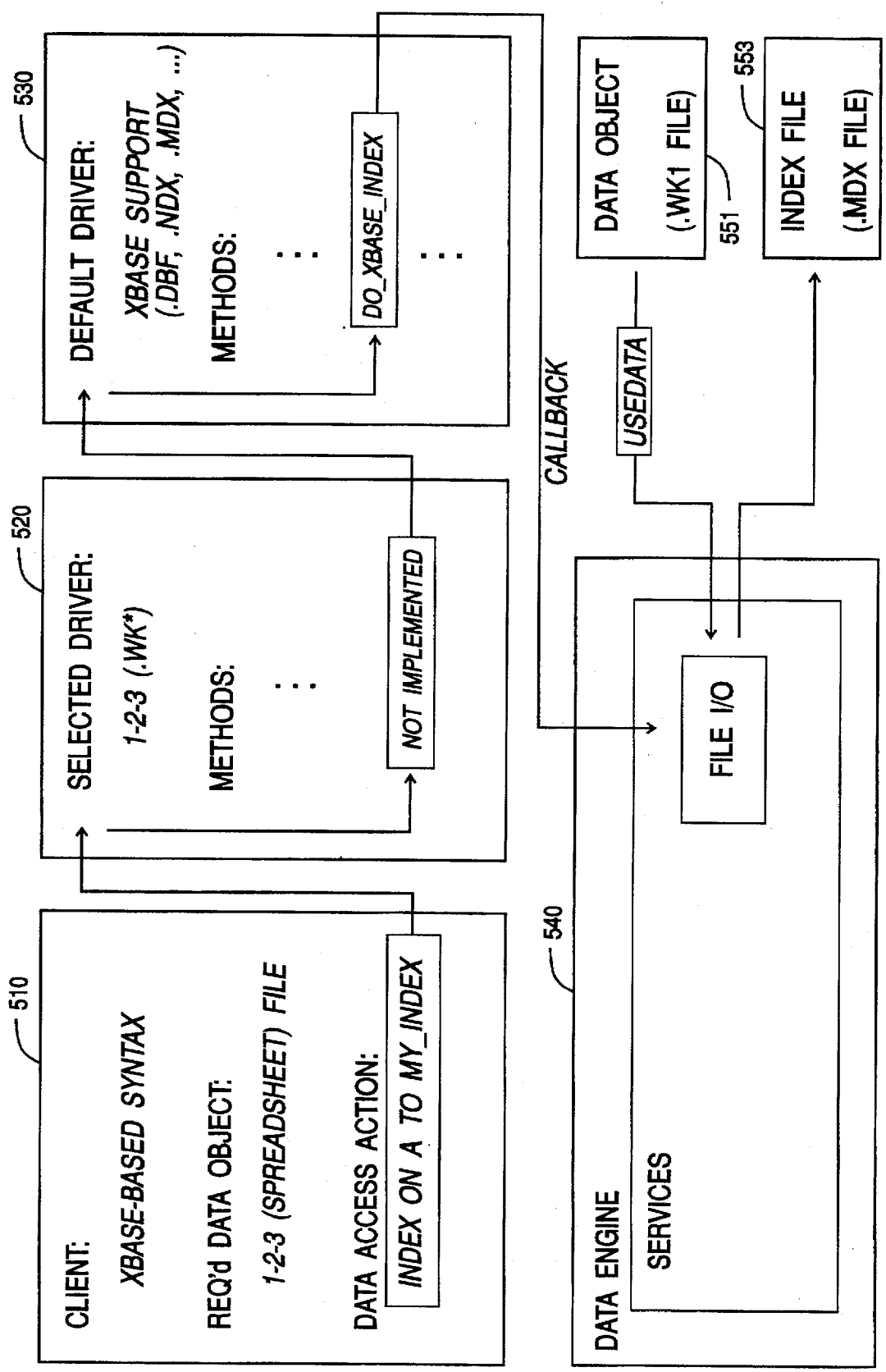
FIG. 5 is a block diagram illustrating processing of a request to create an Xbase index on a spreadsheet file.

An exemplary use of the system for accessing foreign data will now be illustrated with reference to FIG. 5. As shown in the figure, the client is an Xbase client 510 (i.e., supports dBASE-compatible syntax). Through the client, the user has requested access to a 1-2-3 spreadsheet file. Moreover, the user desires the following action: index on A to my_index. As described by the method 400 of FIG. 4, the requested data object 551, a spreadsheet file, invokes the spreadsheet driver (.WK1) for the system, shown here as driver 520. The requested action is passed to the data driver for action. The driver determines from its own stock of methods whether it can appropriately process the request. The requested action (indexing) for the example at hand, however, is one more commonly associated with database, not spreadsheet, files. As shown by the methods of the driver 520, therefore, no method for indexing the spreadsheet exists.

Since the preferred driver cannot appropriately handle the requested task, the driver passes the request to the default driver 530. The default driver, like other drivers, includes various methods for manipulating data objects. As shown in this example, the default driver includes a method which is capable of performing the desired task (creating a dBASE-compatible index on a data object). Thus, the method of the default driver is invoked.

Like the other drivers, the default driver may offload much of its processing burden onto the data engine 540. Specifically, the data engine includes services which support core operations for data objects, including file input/output, memory management, conversion routines, exception handling, and the like. For the example at hand, the invoked method of the default driver calls the file's I/O module of the data engine 540 for performing such tasks as reading the data object 551 and writing a new index file 553. As shown, the previously-described USEDATA data structure serves as an intermediary between the system and the data object.

Figure 1:
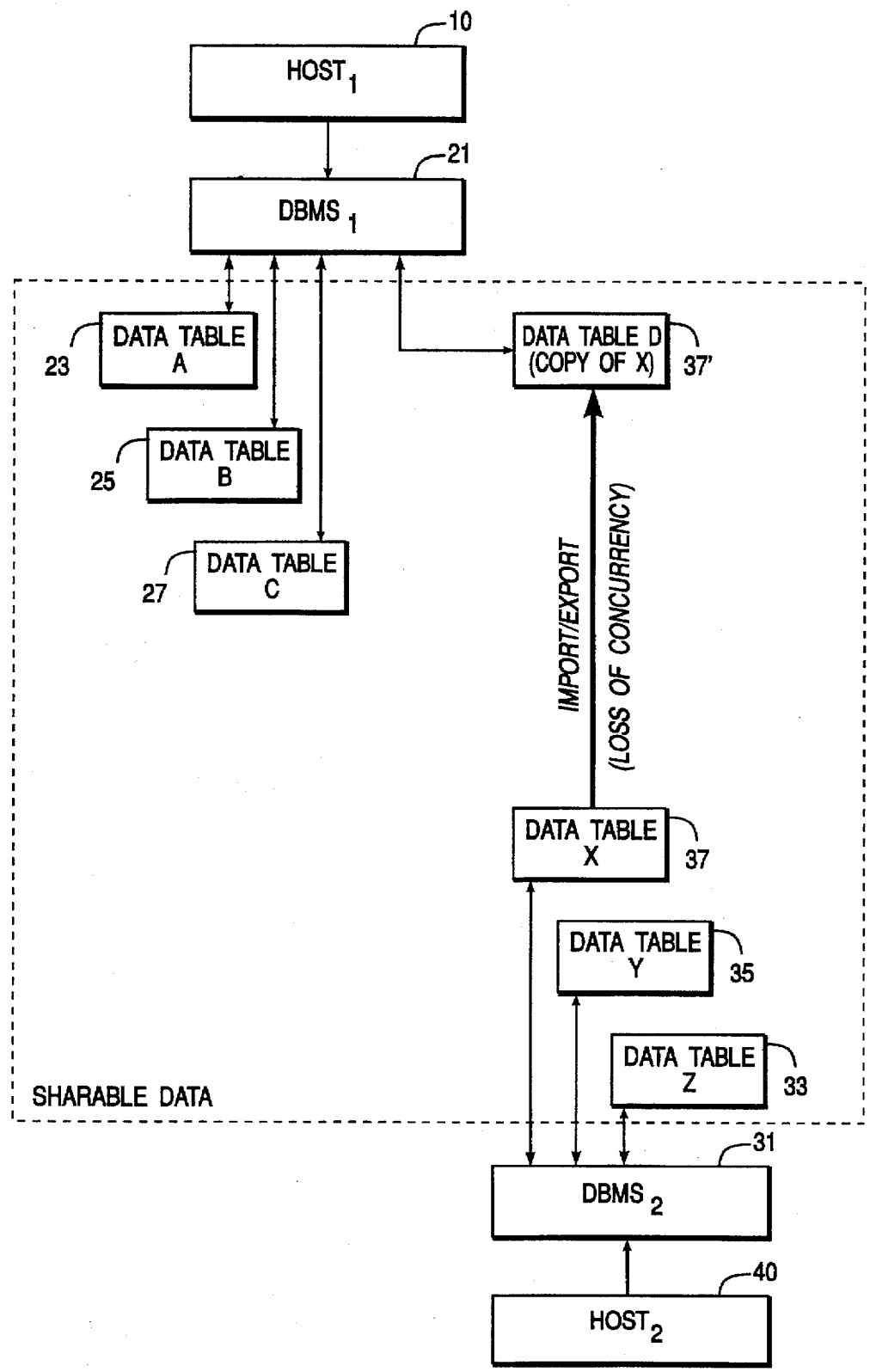
FIG. 1 is a block diagram illustrating the relationship between prior art database managers and individual data objects (e.g., database files).
Figure 6A:
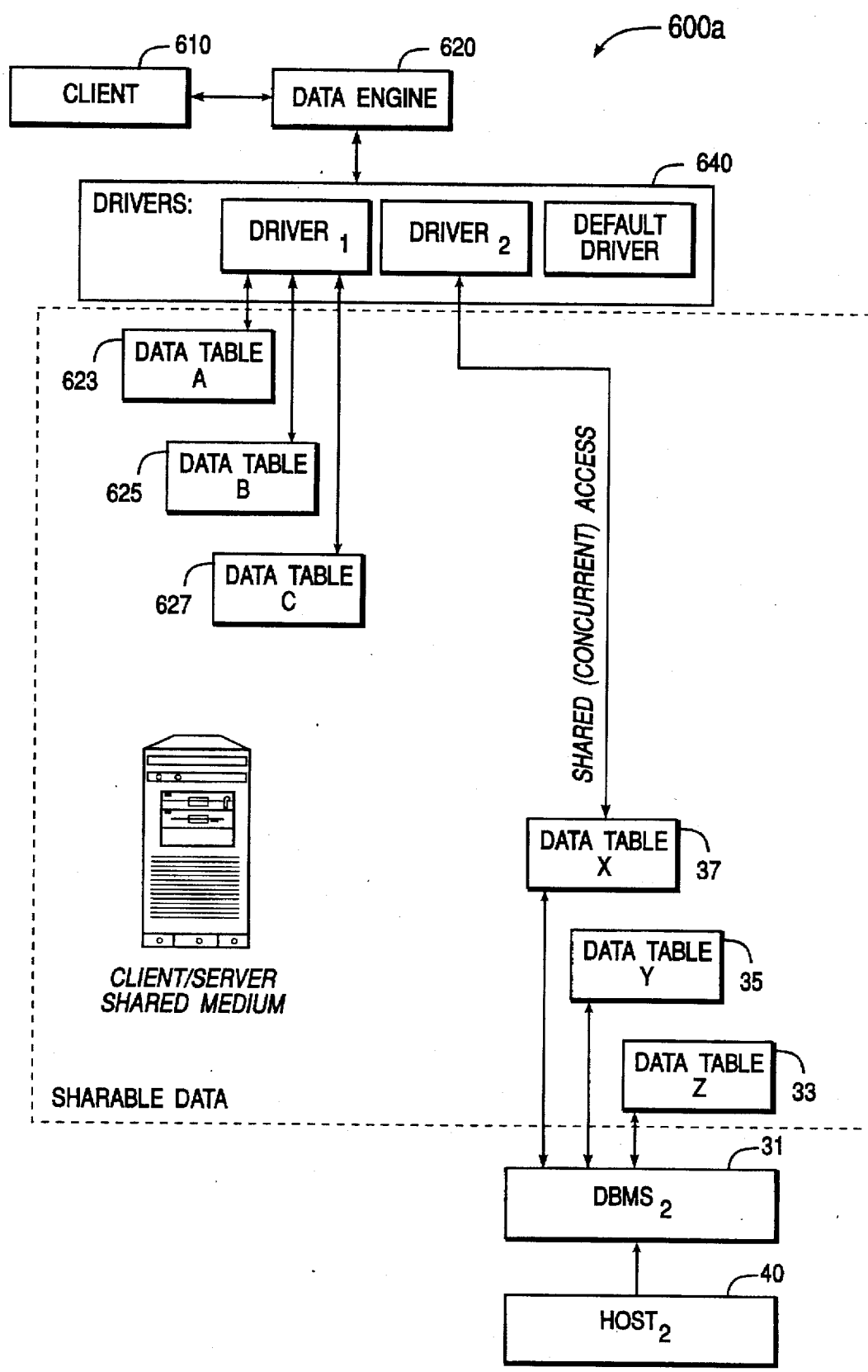
FIGS. 6A–D are block diagrams of the data access system of the present invention operative in various shared environments.

Referring now to FIGS. 6A–D, the system of the present invention will be contrasted against the prior art system of FIG. 1. As shown in FIG. 6A, system 600a includes a client 610, a data engine 620, and drivers 640. The drivers 640 allow the system 600a to concurrently access data objects, including foreign ones. Specifically, drivers 640 include a driver, for accessing data tables 623, 625, 627, and a driver₂ for accessing data table 37 (and data tables 35, 33). As shown in the figure, data tables 623, 625, 627 and data tables 33, 35, 37 represent shared information tables, such as may be stored on the client/server network system 250 (of FIG. 2D).

Figure 6B:
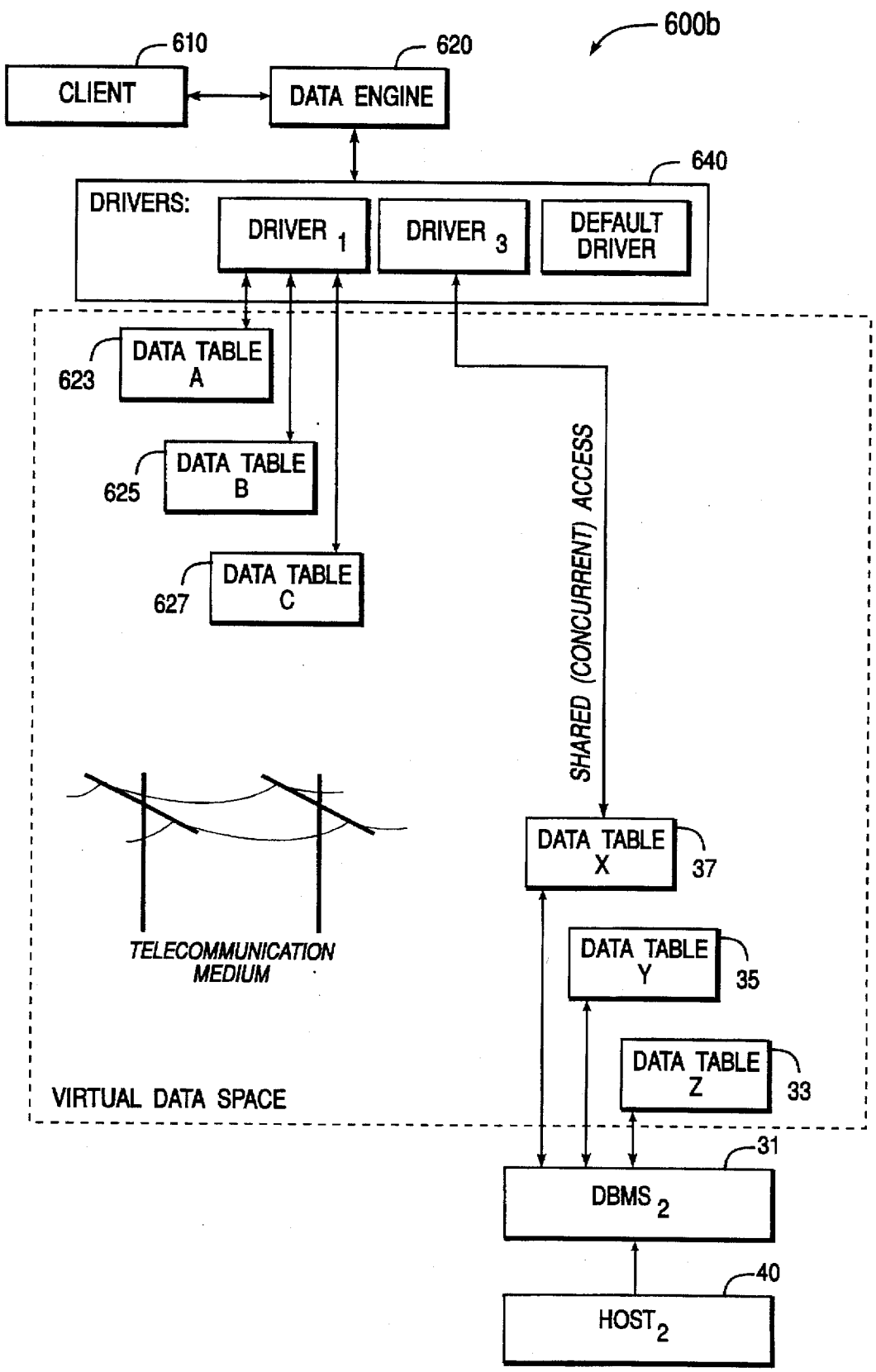

FIG. 6B shows the system 600b, a system similar to the system 600a with the following exception. The data table 37 is concurrently accessed through a telecommunication medium (e.g., modem), instead of on a network. To achieve this functionality, the system 600b need only employ a different driver (driver₃), which is a driver designed for telecommunication access of data objects.

Figure 6C:
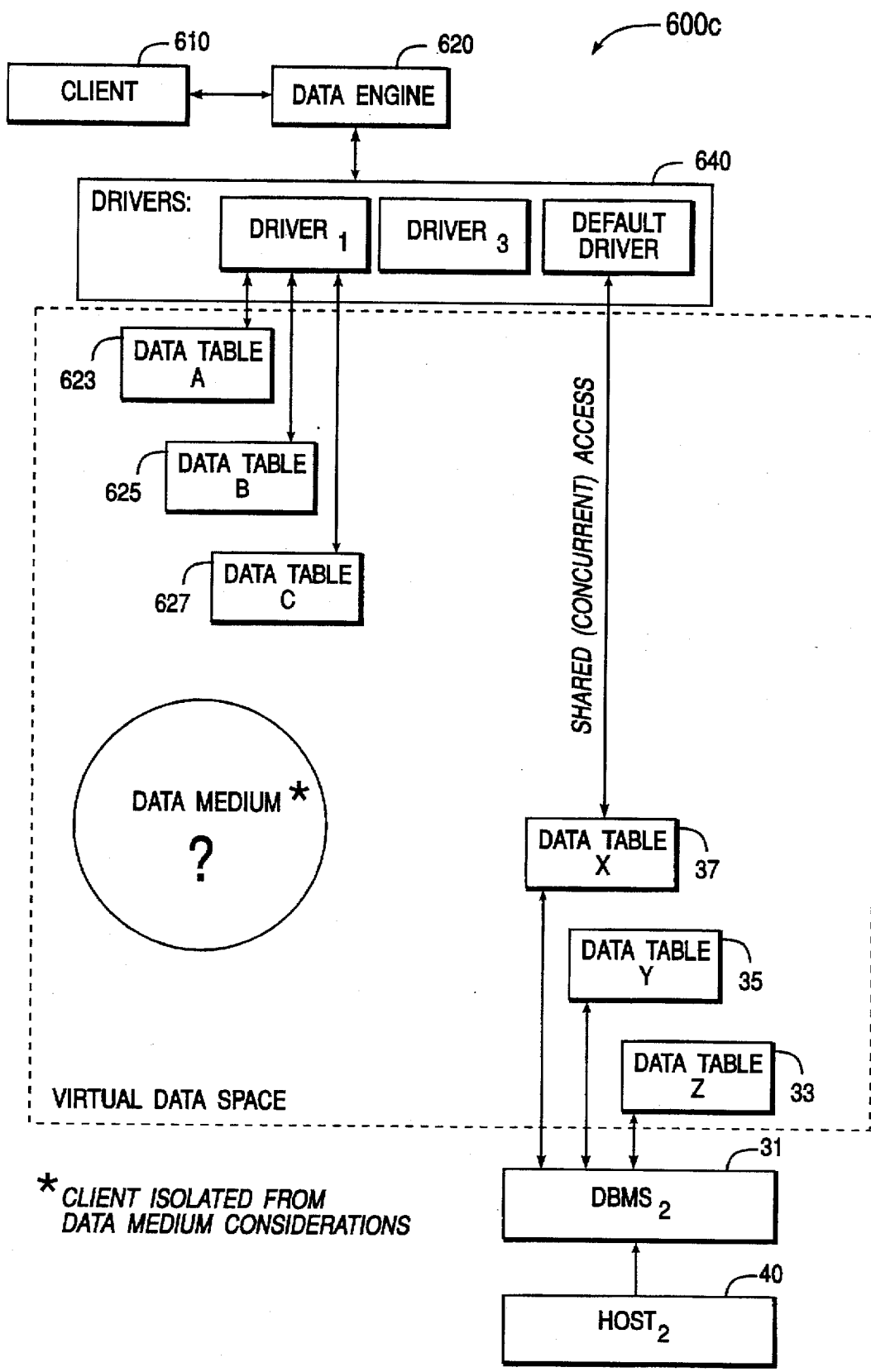
Figure 6D:
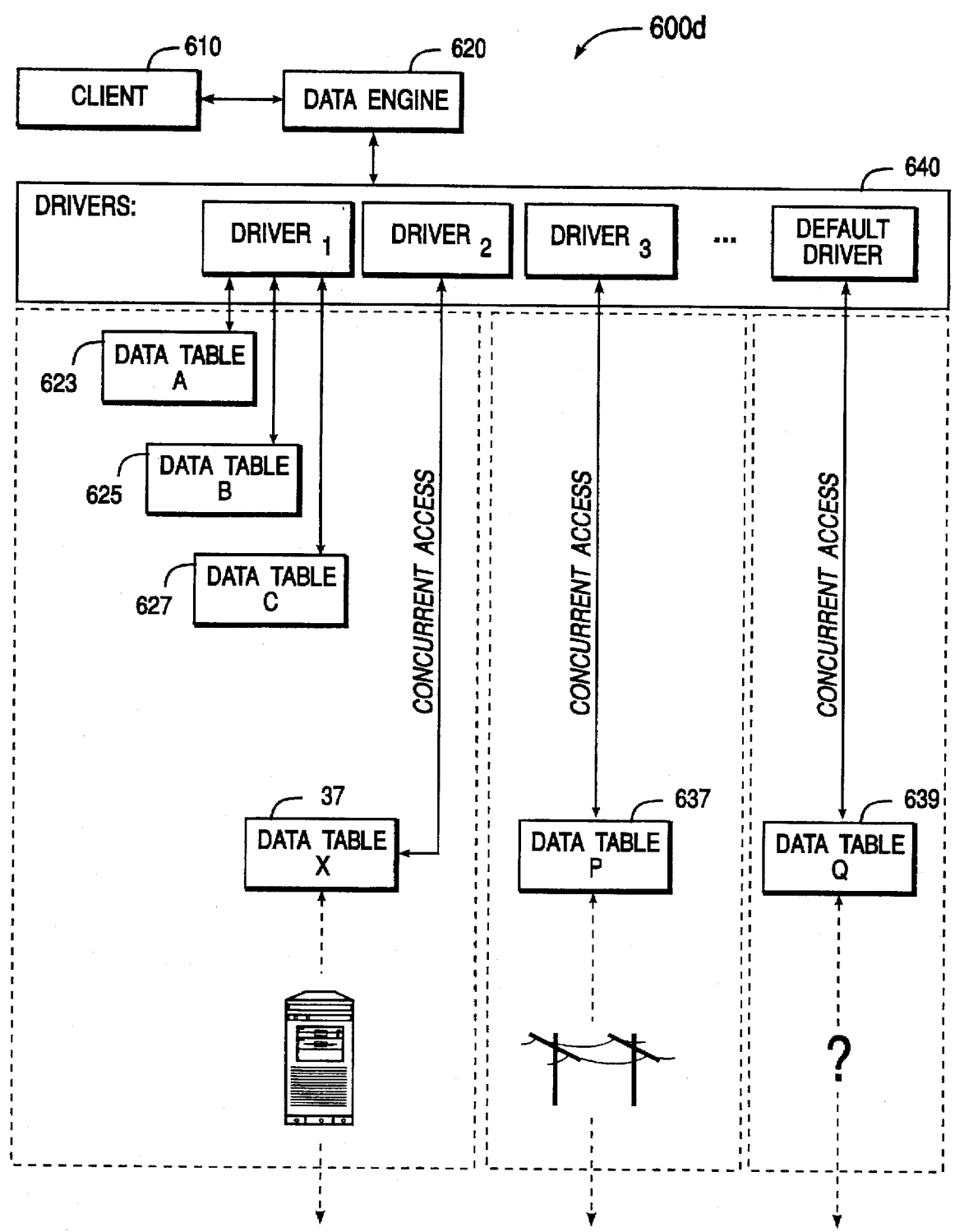

In FIG. 6C, the system 600c is similar to that of system 600b, except as follows. The data space where the shared tables reside may in fact be any medium. More particularly, the system 600c views the tables as existing in a virtual data space. The client 610 need not have any knowledge of the medium. Instead, any media specific details required by the virtual data space are encapsulated within a driver. The driver, in turn, will be loaded (at runtime) only when access to its type of data object is required. FIG. 6D illustrates the configuration of the system when multiple drivers are simultaneously loaded, whereby concurrent access to multiple foreign data objects (including ones of different format) is provided.

Table 1 demonstrates assembly source code listings, which provide a description of the invention suitable for use in a general purpose digital computer system, such as an IBM-compatible personal computer. A suitable compiler and linking for the code is available from several vendors, include Borland International of Scotts Valley, Calif.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the following claims.

TABLE 1

Source Code Listings
Copyright © 1993 Borland International

```
page        60,132
title       db3dbf
Copyright © 1993 Borland International
;
public      zerobuffer,db3a1
;
;include    db3dbf.pub
;
include     struc.inc
include     dstruc.inc
include     ndxstruc.inc
include     dbfstruc.inc
include     rcall.inc
include     memory.equ
include     file.equ
include     dirstruc.inc
;
cseq        segment byte public
;
extrn       adjustbx:near
extrn       testdate0:near,getddata:near
extrn
genret:near,gencword:near,genindex:near,gencall:near
cseg        ends
;
dseg        segment byte public
extrn
buffer:byte,century:byte,dbfsize:word,ndxuse:word
extrn       useaddr:word,dsmsg:word
;
db3a1       db     ?
;
dseg        ends
;
message     segment byte public
extrn       ext_bak:byte,ext_tbk:byte,ext_dbf:byte
message     ends
;
db3         segment byte public
;
extrn
ndxopen:near,ndxclose:near,ndxtop:near,ndxbottom:near
extrn
ndxprev:near,ndxnext:near,ndxfindrec:near,ndxadd:near
extrn       ndxdel:near,ndxcreate:near
extrn       ndxsearch:near,ndxmove:near,ndxcalc:near
extrn       ndxfile:near,ndxdef:near,ndxzap:near
extrn
ndxinit:near,ndxinput:near,ndxexecute:near,ndxoutput:near,ndxexit:near
;
extrn       dbtload:near,dbtsave:near
extrn       dbtopen:near,dbtclose:near,dbtcreate:near
;
assume      cs:db3,ds:dseg
;
```

TABLE 1-continued

Source Code Listings
Copyright © 1993 Borland International

```
db3proc     proc    far
            test    ah,80h
            jnz     db32
            mov     [db3al],al
            push    bx
            mov     bl,ah
            xor     bh,bh
            shl     bx,1
            mov     ax,cs:[bx + db3tbl]
            pop     bx
db31:       call    ax
            ret
db32:       mov     ax,402
            stc
            ret
db3proc     endp
;
db3tbl      dw      db3open         ;00h
            dw      db3close        ;01h
            dw      db3load         ;02h
            dw      db3save         ;03h
            dw      db3append       ;04h
            dw      db3goto         ;05h
            dw      db3top          ;06h
            dw      db3bottom       ;07h
            dw      db3eof          ;08h
            dw      db3skip         ;09h
            dw      db3create       ;0ah
            dw      db3truncate     ;0bh
            dw      db3exist        ;0ch
            dw      db3mode         ;0dh
            dw      db3backup       ;0eh
            dw      db3name         ;0fh
            dw      db3open         ;10h
            dw      db3close        ;11h
            dw      ndxtop          ;12h
            dw      ndxbottom       ;13h
            dw      ndxprev         ;14h
            dw      ndxnext         ;15h
            dw      ndxfindrec      ;16h
            dw      ndxadd          ;17h
            dw      ndxdel          ;18h
            dw      ndxcreate       ;19h
            dw      ndxfile         ;1Ah
            dw      ndxdef          ;1Bh
            dw      ndxsearch       ;1Ch
            dw      ndxzap          ;1Dh
            dw      ndxmove         ;1Eh
            dw      ndxcalc         ;1Fh
            dw      ndxinit         ;20h
            dw      ndxinput        ;21h
            dw      ndxexecute      ;22h
            dw      ndxoutput       ;23h
            dw      ndxexit         ;24h
            dw      db3x            ;25h
            dw      db3x            ;26h
            dw      db3x            ;27h
            dw      db3x            ;28h
            dw      db3x            ;29h
            dw      db3x            ;2Ah
            dw      db3x            ;2Bh
            dw      db3x            ;2Ch
            dw      db3x            ;2Dh
            dw      db3x            ;2Eh
            dw      db3x            ;2Fh
            dw      dbtload         ;30h
            dw      dbtsave         ;31h
            dw      db3x            ;32h
            dw      db3x            ;33h
            dw      db3x            ;34h
            dw      db3x            ;35h
            dw      db3x            ;36h
            dw      db3x            ;37h
            dw      db3dirset       ;38h
            dw      db3dirfirst     ;39h
            dw      db3dirnext      ;3ah
            dw      db3x            ;3bh
;
db3proc1    proc    near
;
db3x:       mov     ax,402
            stc
            ret
;
db3dirset:
            push    cx
            push    dx
            mov     cx,[dsmsg]
            mov     dx,offset ext_dbf
            fcall   filedirset
            pop     dx
            pop     cx
            ret
;
db3dirfirst:
            push    cx
            push    dx
            push    di
            push    es
            fcall   filedirfirst
            jmp     short db3ne1
;
db3dirnext:
            push    cx
            push    dx
            push    di
            push    es
            fcall   filedirnext
db3ne1:     jc      db3nex
            push    bx
            lea     di,[si].dbdrec
            push    ds
            pop     es
            mov     cx,dbdend – dbdrec + 1
            cld
            xor     al,al
            rep     stosb
            mov     al,44h
            fcall   fileopendir
            jc      db3ne11
            mov     di,offset buffer
            mov     cx,32
            fcall   filereadcheck
            jc      db3ne4
            push    word ptr [buffer].db3recn
            pop     word ptr [si].dbdrec
            push    word ptr [buffer].db3recn + 2
            pop     word ptr [si].dbdrec + 2
            call    db3testdate
            jc      db3ne4
            mov     word ptr [si].dbddate,cx
            mov     word ptr [si].daddate + 2,dx
            xor     ax,ax
db3ne4:     push    ax
            fcall   fileclose
            pop     ax
db3ne11:    mov     [si].dbderr,ax
            clc
            pop     bx
db3nex:     pop     es
            pop     di
            pop     dx
            pop     cx
            ret
;
db3backup:
            push    bx
            push    cx
            push    dx
            push    es
            mov     cx,[dsmsg]
            mov     es,[si].uengine.db3seg
```

TABLE 1-continued

Source Code Listings
Copyright © 1993 Borland International

```
                mov     bx,es:[db3dbf]
                mov     dx,offset ext_bak
                or      bx,bx
                jz      db3ba1
                fcall   filerenameext
                jc      db3ax
db3ba1:         mov     bx,es:[db3dbt]
                mov     dx,offset ext_tbk
                or      bx,bx
                jz      db3bax
                fcall   filerenameext
db3bax:         pop     es
                pop     dx
                pop     cx
                pop     bx
                ret
;
db3mode:        push    bx
                push    dx
                push    si
                push    di
                push    es
                mov     es,[si].uengine.db3seg
                mov     al,[db3al]
                or      al,al
                jz      db3mo1
                cmp     al,1
                jz      db3mo11
                cmp     al,8
                jz      db3mo21
                cmp     al,0ffh
                jz      db3mo31
                jmp     short db3mox
db3mo1:         and     byte ptr es:[db3flag],0fdh
                jmp     short db3mo12
db3mo11:        or      byte ptr es:[db3flag],2
db3mo12:        mov     al,es:[db3sve]
                mov     es:[db3buf],al
                jmp     short db3mox
db3mo21:        call    flushbuffer
                jc      db3mox
                mov     es:[db3buf],0
                jmp     short db3mox
db3mo31:        mov     al,8
                cmp     byte ptr es:[db3buf],0
                jz      db3mox
                xor     al,al
                test    byte ptr es:[db3flag],2
                jz      db3mox
                inc     al
db3mox:         jmp     db3opx
;
db3exist:
                push    bx
                push    cx
                push    dx
                mov     al,4ah
                xor     bx,bx
                mov     cx,[dsmsg]
                mov     dx,offset ext_dbf
                fcall   fileexist
                pop     dx
                pop     cx
                pop     bx
                ret
;
db3create:
                push    bx
                push    dx
                push    si
                push    cx
                push    dx
                push    si
                mov     bh,filecreate
                mov     si,1225
                mov     cx,[dsmsg]
                mov     dx,offset ext_dbf
                mov     al,12h
                fcall   filequery
                pop     si
                pop     dx
                pop     cx
                push    di
                push    es
                jnc     db3cr0
                jmp     db3crx
db3cr0:         mov     es,cx
                mov     di,dx
                mov     cx,256
                call    zerobuffer
                mov     byte ptr [buffer].db3vers,3
                mov     ah,2ah
                int     21h
db3cr1:         sub     cx,100
                cmp     cx,100
                jnc     db3cr1
                mov     [buffer].db3yy,cl
                xchg    dl,dh
                mov     word ptr [buffer].db3mm,dx
                mov     [buffer].db3rlen,1
                mov     [buffer].db3hlen,offset db3dbf + 1
                mov     dx,offset buffer
                mov     cx,offset db3dbf
db3cr2:         push    di
                push    es
                mov     di,dx
                push    ds
                pop     es
                fcall   filewrite
                pop     es
                pop     di
                jnc     db3cr2a
                jmp     db3cr21
db3cr2a:        cmp     byte ptr es:[di],0
                jz      db3cr11
                test    byte ptr es:[di].fdstat,8
                jz      db3cr2b
                add     di,offset fdend
                jmp     short db3cr2a
db3cr2b:        push    si
                push    di
                mov     cx,11
                mov     si,offset buffer + db3dbf
                lea     di,[di].fdname
db3cr3:         mov     al,es:[di]
                inc     di
                mov     byte ptr [si],al
                inc     si
                loop    db3cr3
                pop     di
                mov     al,es:[di].fdtype
                cmp     al,'M'
                jnz     db3cr4
                or      byte ptr [buffer].db3vers,80h
db3cr4:         mov     byte ptr [si],al
                add     si,5
                mov     ax,word ptr es:[di].fdlen
                mov     word ptr [si],ax
                inc     si
                inc     si
                xor     ah,ah
                add     [buffer].db3rlen,ax
                mov     cx,offset db3fend
                add     [buffer].db3hlen,cx
                mov     dx,offset buffer + db3dbf
                add     di,offset fdend
                pop     si
                jmp     short db3cr2
db3cr11:        ;create DBT field if appropriate
                test    [buffer].db3vers,80h
                jz      db3cr12
                call    dbtcreate
```

TABLE 1-continued

Source Code Listings
Copyright © 1993 Borland International

```
           jc       db3cr21
db3cr12:   mov      ax,374
           cmp      word ptr [buffer].db3rlen,1
           jz       db3cr21
           mov      word ptr [buffer + 100h],1a0dh
           push     di
           push     es
           mov      di,offset buffer + 100h
           mov      cx,2
           push     ds
           pop      es
           fcall    filewrite
           pop      es
           pop      di
           jc       db3cr21
           fcall    fileseekbegin
           jc       db3cr21
           push     di
           push     es
           mov      di,offset buffer
           mov      cx,offset db3dbf
           push     ds
           pop      es
           fcall    filewrite
           pop      es
           pop      di
           jc       db3cr21
           fcall    fileseekbegin
           jc       db3cr21
           jmp      short db3get
db3cr21:   push     ax
           fcall    fileclosedel
           pop      ax
           stc
db3crx:    jmp      db3opx
;
db3open:   push     bx
           push     dx
           push     si
           xor      bx,bx
           mov      cx,[dsmsg]
           mov      dx,offset ext_dbf
           mov      al,12h
           fcall    fileopenrw
           push     di
           push     es
           jnc      db3get
           jmp      db3opx
;
db3get:    mov      [si].uhandle,bx
           mov      cx,256
           call     zerobuffer
           push     bp
           push     si
           lea      di,[si].ualias
           fcall    filemainname
           mov      cx,8
db3op1:    mov      al,[si]
           cmp      al,' '
           jz       db3op1a
           move     byte ptr [di],al
           inc      si
           inc      di
           loop     db3op1
db3op1a:   mov      byte ptr [di],0
           pop      si
           mov      word ptr [si].udbtype,'BD'
           mov      word ptr [si].udbtype + 2,'F'
           push     di
           push     es
           mov      di,offset buffer
           mov      cx,32
           push     ds
           pop      es
           fcall    filereadcheck
           pop      es
```

TABLE 1-continued

Source Code Listings
Copyright © 1993 Borland International

```
           pop      di
           jc       db3op1c
           mov      al,byte ptr [buffer]
           cmp      al,03h
           jz       db3op1d
           cmp      al,83h
           jnz      db3op1b
           call     dbtopen
           jnc      db3op1d
           push     ax
           fcall    fileclose
           pop      ax
           stc
           jmp      chort db3op1c
db3op1b:   fcall    fileclose
           mov      ax,358
           stc
db3op1c:   jmp      db3op8
db3op1d:   call     db3testdate
           jc       db3op1b
           mov      word ptr [si].uldate,cx
           mov      word ptr [si].uldate + 2,dx
           mov      word ptr [si].ufilfirst,1
           mov      ax,word ptr [buffer].db3recn
           mov      word ptr [si].ufilsize,ax
           mov      word ptr [si].ufillast,ax
           mov      ax,word ptr [buffer].db3recn + 2
           mov      word ptr [si].ufilsize + 2,ax
           mov      word ptr [si].ufillast ° 2,ax
           mov      cx,[buffer].db3rlen
           mov      word ptr [si].urecsize,cx
           mov      word ptr [si].urecsize + 2,0
           mov      ax,[dbfsize]
           shr      ax,1
           or       ax,ax
           jz       db3op1f
           cmp      cx,ax
           jnc      db3op1f
           shl      ax,1
           xor      dx,dx
           div      cx
           mov      [buffer].db3buf,al
           mov      [buffer].db3bsve,al
           mul      cx
           mov      cx,ax
           add      cx,word ptr [buffer].db3rlen
           mov      [buffer].db3lbuf,ax
db3op1f:   push     bx
           mov      bx,offset db3rec
           add      bx,cx
           rcall    adjustbx
           inc      bx
           mcall    mallocate
           pop      bx
           jc       db3op4   ;db3op8
           mov      [si].uengine.db3seg,ax
           mov      es,ax
           push     si
           xor      di,di
           mov      si,offset buffer
           mov      cx,offset db3rec
           cld
           rep      movsb
           pop      si
           mov      es:[db3dbf],bx
           push     bx
           mov      ax,es:[db3hlen]
           sub      ax,offset db3dbf
           xor      dx,dx
           mov      cx,offset db3fend
           div      cx
           mov      cx,offset fdend
           mul      cx
           mov      bx,ax
           mov      bp,ax
           push     bx
```

TABLE 1-continued

Source Code Listings
Copyright © 1993 Borland International

```
              rcall     adjustbx
              inc       bx
              inc       bx
              mcall     mallocate
              pop       cx
              pop       bx
              jc        db3op4      ;db3op8
              mov       [si].ufseg,ax
              mov       dx,es
              mov       es,ax
              xor       di,di
              clc
              xor       al,al
              rep       stosb
              xor       di,di
              mov       cx,offset db3rec
db3op2:       push      cx
              push      di
              push      es
              mov       cx,1000h
              mov       di,offset buffer
              push      ds
              pop       es
              fcall     fileread
              mov       si,1000h
              pop       es
              pop       di
              pop       cx
              jnc       db3op5
db3op4:       jmp       chort db3op8
db3op5:       mov       byte ptr [si + buffer],0
              mov       si,offset buffer
              cld
db3op6:       cmp       bp,di
              jnc       db3op7
              jmp       db3op1b
db3op7:       cmp       byte ptr [si],0dh
              jz        db3op8      ;done
              push      cx
              push      si
              push      di
              lea       di,[di].fdname
              mov       cx,size db3fname
              rep       movsb
              pop       di
              pop       si
              pop       cx
              mov       al,[si].db3ftype
              mov       es:[di].fdtype,al
              mov       ax,word ptr [si].db3flen
              mov       word ptr es:[di].fdlen,ax
              mov       es:[di].fdofs,cx
              mov       es:[di].fdseg,dx
              mov       es:[di].fdstat,0
              mov       es:[di].fdiexcl,0
              mov       es:[di].fdindex,0
              add       cl,[si].db3flen
              adc       ch,0
              add       si,offset db3fend
              add       di,offset fdend
              mov       byte ptr es:[di],0
              cmp       byte ptr [si],0
              jnz       db3op6
              jmp       short db3op2
db3op8:       pop       bp
db3opx:       pop       es
              pop       di
              pop       si
              pop       dx
              pop       bx
              ret
;
db3close:
              push      bx
              push      dx
              push      si
              push      di
              push      es
              mov       cx,[si].uengine.db3seg
              jcxz      db3clx
              mov       es,cx
              mov       bx,es:[db3dbf]
              call      flushbuffer
              jc        db3cl1
              test      byte ptr [si].ustatus,2
              jz        db3cl1
              mov       ah,2ah
              int       21h
db3cl0:       sub       cx,100
              cmp       cx,100
              jnc       db3cl0
              mov       es:[db3yy],cl
              xchg      dl,dh
              mov       word ptr es:[db3mm],dx
              fcall     fileseekbegin
              jc        db3cl1
              push      di
              xor       di,di
              mov       cx,offset db3dbf
              fcall     filewrite
              pop       di
db3cl1:       pushf
              push      ax
              fcall     fileclose
              test      es:[db3vers],80h
              jz        db3cl2
              call      dbtclose
db3cl2:       mcall     mdeallocate
              pop       ax
              popf
db3clx:       jmp       db3opx
;
db3load:      push      bx
              push      dx
              push      si
              push      di
              push      es
              mov       es,[si].uengine.db3seg
              cmp       es:[db3bsve],0
              jnz       db3lo0
              jmp       db3lo41
db3lo0:       mov       ax,word ptr [si].urecnum + 2
              mov       bx,word ptr [si].urecnum
              cmp       es:[db3stat],0
              jz        db3lo1
              cmp       bx,word ptr es:[db3beg]
              jc        db3lo1
              cmp       bx,word ptr es:[db3end]
              jnc       db3lo1
              cmp       ax,word ptr es:[db3beg + 2]
              jnz       db3lo1
              cmp       ax,word ptr es:[db3end + 2]
              jnz       db3lo1
              jmp       db3lo31
db3lo1:       cmp       es:[db3buf],0
              jnz       db3lo2
              jmp       db3lo41
db3lo2:       call      flushbuffer
              jnc       db3lo3
              jmp       db3lox
db3lo3:       mov       word ptr es:[db3beg + 2],ax   ;loading
                                                       from file
              mov       word ptr es:[db3beg],bx
              mov       word ptr es:[db3end + 2],ax
              mov       word ptr es:[db3end],bx
              test      es:[db3flag],2
              jnz       db3lo11
              call      db3seekrec
              jnc       db3lo4
              jmp       db3lox
db3lo4:       call      db3rd
              jnc       db3lo5
```

TABLE 1-continued

Source Code Listings
Copyright © 1993 Borland International

```
             jmp     db3lox
db3lo5:      xor     ax,ax
             jmp     db3lo32
db3lo11:     mov     ax,es:[db3lbuf]
             xor     dx,dx
             div     es:[db3rlen]
             mov     dx,ax
             dec     dx
             mov     ax,word ptr es:[db3beg + 2]
             mov     bx,word ptr es:[db3deg]
             sub     bx,dx
             sbb     ax,0
             cmp     ax,0ffffh
             jnz     db3lo12
             xor     ax,ax
             mov     bx,1
db3lo12:     cmp     ax,word ptr es:[db3beg + 2]
             jnz     db3lo41
             mov     word ptr es:[db3beg + 2],ax
             mov     word ptr es:[db3beg],bx
             mov     word ptr es:[db3end + 2],ax
             mov     word ptr es:[db3end],bx
             mov     bx,es:[db3rlen]
             mul     bx
             mov     cx,ax
             mov     ax,word ptr es:[db3beg]
             call    db3se1
             jnc     db3lo13
             jmp     short db3lox
db3lo13:     call    db3rd
             jnc     db3lo14
             jmp     short db3lox
db3lo14:     mov     bx,word ptr [si].urecnum
             mov     ax,word ptr [si].urecnum + 2
             cmp     ax,word ptr es:[db3end + 2]
             jnz     db3lo15
             cmp     bx,word ptr es:[db3end]
             jbe     db3lo31
db3lo15:     mov     ax,338
             stc
             jmp     short db3lox
db3lo31:     mov     ax,word ptr es:[db3beg]    ;loading
from buffer
             sub     bx,ax
             inc     ax
             mov     cx,es:[db3rlen]
             mov     ax,cx
             mul     bx
db3lo32:     add     ax,es[db3rlen]
             push    si
             push    di
             push    ds
             push    es
             pop     ds
             mov     di,offset db3stat
             mov     si,di
             add     si,ax
             cld
             rep     movsb
             pop     ds
             pop     di
             pop     si
             clc
             jmp     chort db3lo42
db3lo41:     call    db3seekrec                 ;no
buffer
             jc      db3lox
             push    di
             mov     cx,es:[db3rlen]
             mov     di,offset db3stat
             fcall   filereadcheck
             pop     di
             jc      db3lox
db3lo42:     mov     al,es:[db3stat]
             xor     ah,ah
             cmp     al,'*'
             jnz     db3lo43
             dec     ah
db3lo43:     mov     [si].udelete,ah
             clc
db3lox:      jmp     db3opx
;
db3rd:       push    di
             mov     cx,es:[db3lbuf]
             mov     di,offset db3stat
             add     di,es:[db3rlen]
             fcall   fileread
             pop     di
             jc      db3rdx
             mov     cx,es:[db3rlen]
             cmp     ax,cx
             jnc     db3rd1
             mov     ax,338
             jmp     short db3rdx
db3rd1:      xor     dx,dx
             div     cx
             add     word ptr es:[db3end],ax
             adc     word ptr es:[db3end + 2],0
             clc
db3rdx:      ret
;
db3save:     push    bx
             push    dx
             push    si
             push    di
             push    es
             mov     es,[si].uenging.db3seg
             mov     al,[si].udelete
             mov     ah,' '
             or      al,al
             jz      db3sa0a
             mov     ah,'*'
db3sa0a:     mov     es:[db3stat],ah
             cmp     es:[db3bsve],0
             jnz     db3sa0
             jmp     short db3sa4
db3sa0:      mov     ax,word ptr [si].urecnum + 2
             mov     bx,word ptr [si].urecnum
             cmp     es:[db3stat],0
             jz      db3sa4
             cmp     bx,word ptr es:[db3beg]
             jc      db3sa4
             cmp     bx,word ptr es:[db3end]
             jnc     db3sa4
             cmp     ax,word ptr es:[db3beg + 2]
             jnz     db3sa4
             cmp     ax,word ptr es:[db3end + 2]
             jnz     db3sa4
             mov     cx,bx
             sub     cx,word ptr es:[db3beg]
             inc     cx
             cmp     es:[db3sbeg],0
             jz      db3sa1
             cmp     cx,es:[db3sbeg]
             jnc     db3sa2
db3sa1:      mov     es:[db2sbeg],cx
db3sa2:      cmp     es:[db3send],cx
             jnc     db3sa3
             mov     es:[db3send],cx
db3sa3:      mov     ax,word ptr es:[db3beg]    ;saving
to buffer
             sub     bx,ax
             inc     ax
             mov     cx,es:[db3rlen]
             mov     ax,cx
             mul     bx
             add     ax,es:[db3rlen]
             push    si
             push    di
             push    ds
             push    es
             pop     ds
```

TABLE 1-continued

Source Code Listings
Copyright © 1993 Borland International

```
                mov     di,offset db3stat
                mov     si,di
                add     di,ax
                cld
                rep     movsb
                pop     ds
                pop     di
                pop     si
                clc
                jmp     short db3sax
db3sa4:         call    db3seekrec              ;saving
to file
                jc      db3sax
                push    di
                mov     cx,es:[db3rlen]
                mov     di,offset db3stat
                fcall   filewrite
                pop     di
db3sax:         jmp     db3opx
;
db3truncate:
                push    bx
                push    dx
                push    si
                push    di
                push    es
                mov     es,[si].uengine.db3seg
                mov     word ptr es:[db3recn],dx
                mov     word ptr es:[db3recn + 2],cx
                mov     word ptr [si].ufillast,dx
                mov     word ptr [si].ufillast + 2,cx
                mov     word ptr [si].ufilsize,dx
                mov     word ptr [si].ufilsize + 2,cx
                mov     word ptr [si].urecnum,dx
                mov     word ptr [si].urecnum + 2,cx
                add     word ptr [si].urecnum,1
                adc     word ptr [si].urecnum + 2,0
                call    flushbuffer
                jc      db3trx
                call    delbuffer
                call    db3seekrec
                jc      db3trx
                fcall   filetruncate
                jc      db3trx
                mov     al,1ah
                fcall   filewritechar
db3trx:         jmp     db3opx
;
db3append:
                push    bx
                push    dx
                push    si
                push    di
                push    es
                mov     es,[si].uengine.db3seg
                mov     al,[si].udelete
                mov     ah,' '
                or      al,al
                jz      db3ap1
                mov     ah,'*'
db3ap1:         mov     es:[db3stat],ah
                cmp     es:[db3sve],0
                jnz     db3ap11
                call    db3seekrec
                jc      db3ap2  ;db3apx
                mov     di,offset db3stat
                add     di,es:[db3rlen]
                push    word ptr es:[di]
                mov     byte ptr es:[di],1ah
                push    di
                mov     cx,es:[db3rlen]
                inc     cx
                mov     di,offset db3stat
                fcall   filewrite
                pop     di
                pop     word ptr es:[di]
                jc      db3ap2  ;db3apx
                jmp     db3ap21
db3ap2:         jmp     db3apx
db3ap11:        mov     ax,word ptr es:[db3recn + 2]
                mov     bx,word ptr es:[db3recn]
                add     bx,1
                adc     ax,0
                test    byte ptr es:[db3flag],1
                jz      db3ap12
                cmp     ax,word ptr es:[db3beg + 2]
                jnz     db3ap12
                cmp     ax,word ptr es:[db3end + 2]
                jnz     db3ap12
                push    ax
                mov     ax,es:[db3send]
                sub     ax,es:[db3sbeg]
                inc     ax
                inc     ax
                mul     es:[db3rlen]
                cmp     ax,es:[db3lbuf]
                pop     ax
                ja      db3ap12
                or      dx,dx
                jz      db3ap14
db3ap12:        call    flushbuffer
                jnc     db3ap13
                jmp     db3apx
db3ap13:        or      byte ptr es:[db3flag],1
                mov     word ptr es:[db3beg],bx
                mov     word ptr es:[db3end],bx
                mov     word ptr es:[db3beg + 2],ax
                mov     word ptr es:[db3end + 2],ax
                mov     es:[db3sbeg],1
                mov     es:[db3send],0
                mov     di,es:[db3rlen]
                jmp     short db3ap15
db3ap14:        mov     ax,es:[db3send]
                sub     ax,es:[db3sbeg]
                inc     ax
                inc     ax
                mul     es:[db3rlen]
                mov     di,ax
db3ap15:        push    si
                add     di,offset db3stat
                mov     si,offset db3stat
                mov     cx,es:[db3rlen]
                push    ds
                push    es
                pop     ds
                cld
                rep     movsb
                pop     ds
                pop     si
                inc     es:[db3send]
                add     word ptr es:[db3end],1
                pushf
                adc     word ptr es:[db3end + 2],0
                popf
                jnz     db3ap21
                call    flushbuffer
                jc      db3apx
                call    delbuffer
db3ap21:        add     word ptr es:[db3recn],1
                adc     word ptr es:[db3recn + 2],0
                add     word ptr [si].ufilsize,1
                adc     word ptr [si].ufilsize + 2,0
                add     word ptr [si].ufillast,1
                adc     word ptr [si].ufillast + 2,0
                clc
db3apx:         jmp     db3opx
;
flushbuffer:
                and     byte ptr es:[db3flag],0feh
                cmp     es:[db3sbeg],0
                jnz     flbuf1
                ret
```

TABLE 1-continued

Source Code Listings
Copyright © 1993 Borland International

```
flbuf1:      cmp     es:[db3bsve],0
             jnz     flbuf2
             ret
flbuf2:      push    ax
             push    bx
             push    cx
             push    dx
             push    si
             push    di
             mov     si,word ptr es:[db3beg]
             mov     di,word ptr es:[db3beg + 2]
             mov     bx,es:[db3rlen]
             mov     cx,es:[db3sbeg]
             dec     cx
             add     si,cx
             adc     di,0
             mov     ax,di
             mul     bx
             mov     cx,ax
             mov     ax,si
             pop     di
             pop     si
             call    db3se1
             jc      flbufx
             mov     cx,es:[db3sbeg]
             mov     ax,es:[db3send]
             sub     ax,cx
             inc     ax
             mul     es:[db3rlen]
             xchg    ax,cx
             mul     es:[db3rlen]
             push    di
             mov     di,offset db3stat
             add     di,ax
             fcall   filewrite
             pop     di
             jc      flbufx
             mov     es:[db3sbeg],0
             mov     es:[db3send],0
flbufx:      pop     dx
             pop     cx
             pop     bx
             jc      flbufy
             pop     ax
             ret
flbufy:      add     sp,2
             stc
             ret
;
delbuffer:
             push    di
             mov     di,offset db3beg
             mov     cx,6
             xor     ax,ax
             cld
             rep     stosw
             pop     di
             ret
db3eof:      push    bx
             push    dx
             push    si
             push    di
             push    es
             mov     es,[si].uengine.db3seg
             mov     ax,word ptr es:[db3recn + 2]
             mov     bx,word ptr es:[db3recn]
             mov     cx,ax
             mov     dx,bx
             add     dx,1
             adc     cx,0
             jmp     short db3go0
;
db3bottom:
             push    bx
             push    dx
             push    si
```

```
             push    di
             push    es
             mov     es,[si].uengine.db3seg
             mov     ax,word ptr es:[db3recn + 2]
             mov     bx,word ptr es:[db3recn]
             mov     cx,ax
             mov     dx,bx
             jmp     short db3go0
;
db3top:      push    bx
             push    dx
             push    si
             push    di
             push    es
             mov     es,[si].uengine.db3seg
             mov     ax,word ptr es:[db3recn + 2]
             mov     bx,word ptr es:[db3recn]
             xor     cx,cx
             mov     dx,1
             jmp     chort db3go0
;
db3skip:     add     dx,word ptr [si].urecnum
             adc     cx,word ptr [si].urecnum + 2
db3goto:     push    bx
             push    dx
             push    si
             push    di
             push    es
             mov     es,[si].uengine.db3seg
             mov     ax,word ptr es:[db3recn + 2]
             mov     bx,word ptr es:[db3recn]
db3got0:     or      bx,bx
             jnz     db3go11
             or      ax,ax
             jnz     db3go11
             mov     word ptr [si].urecnum,1      ;no
records available
             mov     word ptr [si].urecnum + 2,0
             mov     ax,0ffffh
             jmp     short db3gox
db3go11:     cmp     ax,cx
             jz      fb3go12
             jc      db3go13
             jmp     short db3go15
db3go12:     cmp     bx,dx
             jnc     db3go15
db3go13:     inc     bx
             jnz     db3go14
             inc     ax
db3go14:     mov     word ptr [si].urecnum,bx     ;eof
             mov     word ptr [si].urecnum + 2,ax
             mov     ax,0ff00h
             jmp     short db3gox
db3go15:     or      dx,dx
             jnz     db3go16
             or      cx,cx
             jnz     db3go16
             mov     word ptr [si].urecnum,1      ;bof
             mov     word ptr [si].urecnum + 2,0
             mov     ax,00ffh
             jmp     chort db3gox
db3go16:     mov     word ptr [si].urecnum,dx     ;seek
to existing record
             mov     word ptr [si].urecnum + 2,cx
             xor     ax,ax
db3gox:      clc
             jmp     db3opx
;
;db3ldate:
;            push    es
;            mov     es,[si].uengine.db3seg
;            mov     cl,es:[db3yy]
;            xor     ch,ch
;            cmp     cl,80
;            jnc     db3ld1
;            add     cx,100
```

TABLE 1-continued

Source Code Listings
Copyright © 1993 Borland International

```
;db3ld1:    add     cx,1900
;           mov     dh,es:[db3mm]
;           mov     dl,es:[db3dd]
;           pop     es
;           clc
;           ret
;
db3name:    push    bx
            push    si
            push    es
            mov     es,[si].uengine.db3seg
            mov     bx,es:[db3dbf]
            mov     cx,[dsmsg]
            mov     dx,offset ext_dbf
            fcall   filetruename
            mov     cx,ds
            mov     dx,si
            pop     es
            pop     si
            pop     bx
            clc
            ret
;
db3seekrec:
            push    es
            mov     es,[si].uengine.db3seg
            mov     bx,es:[db3rlen]
            mov     ax,word ptr [si].urecnum + 2
            mul     bx
            mov     cx,ax
            mov     ax,word ptr [si].urecnum
            call    db3se1
            pop     es
            ret
;
db3se1:     mul     bx
            add     cx,dx
            mov     dx,ax
            add     dx,es:[db3hlen]
            adc     cx,0
            sub     dx,bx
            sbb     cx,0
            mov     al,0
            mov     bx,es:[db3dbf]
            fcall   fileseek
            ret
;
zerobuffer:
            push    ax
            push    cx
            push    di
            push    es
            push    ds
            pop     es
            mov     di,offset buffer
            cld
            xor     ax,ax
            rep     stosw
            pop     es
            pop     di
            pop     cx
            pop     ax
            ret
;
db3testdate:
            mov     cl,[buffer].db3yy
            mov     dh,[buffer].db3mm
            mov     dl,[buffer].db3dd
            xor     ch,ch
            cmp     cl,100
            jnc     db3tdx
            cmp     cl,80
            jnc     db3td1
            add     cx,100
db3td1:     add     cx,1900
            rcall1  testdate0
            jc      db3tdx
            ret
db3tdx:     stc
            mov     ax,358
            ret
;
db3proc1    endp
db3         ends
            end page    60,132
            title   db3dbt
Copyright © 1993 Borland International
;
            include struc.inc
            include destruc.inc
            include rcall.inc
;include    db3dbt.pub
            include dbfstruc.inc
            include memory.equ
            include file.equ
;
dbtsize     equ     512
;
            public  dbtopen,dbtclose,dbtcreate,dbtload,dbtsave
            public  enddb3
;
cseg        segment byte public
;
            extrn   adjustbx:near
            extrn   storedd:near
cseg        ends
;
message     segment byte public
            extrn   ext_dbt:byte
message     ends
;
dsg         segment byte public
            extrn   dsmsg:word,buffer:byte,safety:byte
dbtes       dw      ?
dbtcx       dw      ?
dbtdx       dw      ?
dbtbx       dw      ?
dseg        ends
;
db3         segment byte public
;
            assume  cs:db3,ds:dseg
;
db3proc3    proc    near
;
dbt01       dd      1
dbt02       db      16 dup (?)
;
dbtload:    push    bx
            push    dx
            push    si
            push    di
            push    es
            mov     [dbtes],es
            mov     [dbtbx],bx
            mov     [dbtcx],cx
            mov     [dbtdx],dx
            call    dbtcalcpage
            mov     es,[si].uengine.db3seg
            or      dx,dx
            jnz     dbtlo1
            or      bx,bx
            jnz     dbtlo1
            jmp     dbtlo22
dbtlo1:     xor     al,al
            mov     es:[dbtlen],0
            mov     word ptr es:[dbtlast],dx
            mov     word ptr es:[dbtlast + 2],bx
            cmp     word ptr es:[dbtblk],dx
```

TABLE 1-continued

Source Code Listings
Copyright © 1993 Borland International

```
              jnz       dbtlo1a
              mov       word ptr es:[dbtblk + 2],bx
              jz        dbtlo3
dbtlo1a:      mov       word ptr es:[dbtblk],dx
              mov       word ptr es:[dbtblk + 2],bx
dbtlo2:       call      dbtread
              jnc       dbtlo3
              jmp       dbtlox
dbtlo3:       inc       es:[dbtlen]
              xor       si,si
              cld
              push      ds
              push      es
              push      es:[dbtseg]
              mov       es,[dbtes]
              pop       ds
dbtlo4:       mov       ah,al
              lodsb
              or        al,al
              jnz       dbtlo5
              cmp       si,dbtsize
              jnz       dbtlo4
              jmp       short dbtlo9
dbtlo5:       cmp       al,1ah
              jz        dbtlo21   ;done
              cmp       ax,8d0ah
              jnz       dbtlo6
              mov       ah,0dh
              jmp       short dbtlo7
dbtlo6:                 ;more exchanges
              jmp       short dbtlo8
dbtlo7:       mov       byte ptr es:[di − 1],ah
dbtlo8:       stosb
              cmp       si,dbtsize
              jnz       dbtlo10
              dec       cx
              jz        dbtlo11
dbtlo9:       pop       es
              pop       ds
              add       word ptr es:[dbtblk],1
              adc       word ptr es:[dbtblk],0
              jmp       short dbtlo2
dbtlo10:      loop      dbtlo4
              pop       es
              jmp       short dbtlo12
dbtlo11:      pop       es
              jmp       short dbtlo13
dbtlo12:      cmp       si,dbtsize
              jz        dbtlo13
              lodsb
              cmp       al,1ah
              jz        dbtlo14
              inc       cx
              jz        dbtlo14
              jmp       short dbtlo12
dbtlo13:      pop       ds
              add       word ptr es:[dbtblk],1
              adc       word ptr es:[dbtblk],0
              call      dbtread
              jc        dbtlox
              inc       es:[dbtlen]
              xor       si,si
              cld
              push      ds
              mov       ds,es:[dbtseg]
              jmp       short dbtlo12
dbtlo14:      pop       ds
              mov       ax,cx
              mov       cx,[dbtcx]
              add       ax,cx
              clc
              jmp       short dbtlox
dbtlo21:      pop       es
              pop       ds
              sub       cx,[dbtcx]
              not       cx
              inc       cx
              jmp       short dbtlo23
dbtlo22:      xor       cx,cx
dbtlo23:      mov       ax,cx
              clc
dbtlox:       pop       es
              pop       di
              pop       si
              pop       dx
              pop       bx
              ret
;
dbtsave:      push      bx
              push      dx
              push      si
              push      di
              push      es
              mov       [dbtes],es
              mov       [dbtbx],bx
              mox       [dbtcx],cx
              mov       [dbtdx],dx
              call      dbtcalcpage
              mov       es,[si].uengine.db3seg
              jcxz      dbtsa21
              mov       ax,cx
              add       ax,2
              mov       cl,9
              shr       ax,cl
              inc       ax
              or        dx,dx
              jnz       dbtsa1
              or        dx,dx
              jz        dbtsa11
dbtsa1:       cmp       ax,1
              jz        dbtsa12
              cmp       dx,word ptr es:[dbtlast]
              jnz       dbtsa11
              cmp       bx,word ptr es:[dbtlast + 2]
              jnz       dbtsa11
              cmp       es:[dbtlen],ax
              jae       dbtsa13
dbtsa11:      call      dbtfreepage
dbtsa12:      mov       word ptr es:[dbtlast],dx
              mov       word ptr es:[dbtlast + 2],bx
dbtsa13:      mov       es:[dbtlen],ax
              mov       word ptr es:[dbtblk],dx
              mov       word ptr es:[dbtblk + 2],bx
              call      dbtseek
              jc        dbtsax
              push      dx
              push      di
              push      es
              mov       dx,di
              mov       cx,[dbtcx]
              add       di,cx
              mov       es,[dbtes]
              push      word ptr es:[di]
              mov       word ptr es:[di],1a1ah
              add       cx,2
              push      di
              mov       di,dx
              fcall     filewrite
              pop       di
              pop       word ptr es:[di]
              pop       es
              pop       di
              pop       dx
              jc        dbtsax
              call      dbtwritepage
              jmp       short dbtsax
dbtsa21:      push      es
              cld
              mov       es,[dbtbx]
              mov       di,[dbtdx]
              mov       cx,10
              mov       al,' '
```

TABLE 1-continued

Source Code Listings
Copyright © 1993 Borland International

```
                cld
                rep       stosb
                pop       es
dbtsax:         mov       word ptr es:[dbtblk],0
                mov       word ptr es:[dbtblk + 2],0
                pop       es
                pop       di
                pop       si
                pop       dx
                pop       bx
                ret
;
dbtfreepage:
                mov       dx,word ptr es:[dbtend]
                mov       bx,word ptr es:[dbtend + 2]
                add       word ptr es:[dbtend],ax
                adc       word ptr es:[dbtend + 2],0
                or        byte ptr es:[db3flag],80h
                ret
;
dbtcreate:
                push      bx
                push      cx
                push      dx
                push      di
                push      es
                push      cs
                pop       es
                mov       cx,[dsmsg]
                mov       dx,offset ext_dbt
                mov       al,16h
                fcall     filecreatens
                jc        dbtcr99
                mov       cx,16
                mov       di,offset dbt01
                fcall     filewrite
                jc        dbtcr97
                mov       cx,dbtsize / 16 − 1
dbtcr1:         push      cx
                mov       cx,16
                mov       di,offset dbt02
                fcall     filewrite
                pop       cx
                jc        dbtcr97
                loop      dbtcr1
                fcall     fileclose
                clc
                jmp       short dbtcrx
dbtcr97:        fcall     fileclosedel
dbtcr99:        mov       ax,407
                stc
dbtcrx:         pop       es
                pop       di
                pop       dx
                pop       cx
                pop       bx
                ret
;
dbtopen:        push      bx
                push      cx
                push      dx
                push      di
                push      es
                push      bx
                mov       bx,dbtsize / 16
                mcall     mallocate
                pop       bx
                jc        dbtop99
                mov       [buffer].dbtseg,ax
                mov       cx,[dsmsg]
                mov       dx,offset ext_dbt
                mov       al,16h
                fcall     fileopenrw
                jc        dbtop98
                mov       di,offset buffer + dbtend
                mov       cx,4
                push      ds
                pop       es
                fcall     filereadcheck
                jc        dbtop97
                cmp       word ptr [buffer].dbtend,0
                jnz       dbtop1
                cmp       word ptr [buffer].dbtend + 2,0
                jz        dbtop97
dbtop1:         mov       [buffer].db3dbt,bx
                jmp       short dbtopx
dbtop97:        fcall     fileclose
dbtop98:        mov       es,[buffer].dbtseg
                mcall     mdeallocate
                mov       ax,407
dbtop99:        stc
dbtopx:         pop       es
                pop       di
                pop       dx
                pop       cx
                pop       bx
                ret
;
dbtclose:
                push      bx
                push      cx
                push      dx
                push      di
                mov       bx,es:[db3dbt]
                or        bx,bx
                jz        dbtcl2
                test      byte ptr es:[db3flag],80h
                jz        dbtcl1
                fcall     fileseekbegin
                mov       cx,4
                mov       di,offset dbtend
                fcall     filewrite
dbtcl1:         fcall     fileclose
                mov       es:[db3dbt],0
dbtcl2:         mov       cx,es:[dbtseg]
                jcxz      dbtclx
                push      es
                mov       es,cx
                mcall     mdeallocate
                pop       es
                mov       es:[dbtseg],0
dbtclx:         clc
                pop       di
                pop       dx
                pop       cx
                pop       bx
                ret
;
dbtread:        push      bx
                push      cx
                push      dx
                push      di
                push      es
                call      dbtseek
                jc        dbtre1
                push      di
                push      es
                mov       cx,dbtsize
                xor       di,di
                mov       es,es:[dbtseg]
                fcall     fileread
                pop       es
                pop       di
                jc        dbtre1
                or        ax,ax
                jnz       dbtre2
                mov       ax,338
dbtre1:         stc
                mov       word ptr es:[dbtblk],0
                mov       word ptr es:[dbtblk + 2],0
                jmp       short dbtrex
dbtre2:         mov       es,es:[dbtseg]
```

TABLE 1-continued

Source Code Listings
Copyright © 1993 Borland International

```
            cmp     ax,dbtsize
            jz      dbtrex
            mov     di,ax
            mov     byte ptr es:[di],1ah
            clc
dbtrex:     pop     es
            pop     di
            pop     dx
            pop     cx
            pop     bx
            ret
;
dbtseek:    push    cx
            push    dx
            mov     ax,dbtsize
            mul     word ptr es:[dbtblk]
            mov     cx,dx
            push    ax
            mov     ax,dbtsize
            mul     word ptr es:[dbtblk + 2]
            add     cx,ax
            pop     dx
            mov     bx,es:[db3bt]
            xor     al,al
            fcall   fileseek
            pop     dx
            pop     cx
            ret
;
dbtcalcpage:                ;returns page # in bx:dx
            push    ax
            push    cx
            push    si
            push    ds
            mov     ds,bx
            mov     si,dx
            xor     ah,ah
            xor     bx,bx
            xor     dx,dx
            mov     cx,10
            cld
dbtca1:     lodsb
            cmp     al,' '
            jnz     dbtca3
            loop    dbtca1
            jmp     short dbtcax
dbtca2:     lodsb
dbtca3:     sub     al,'0'
            jb      dbtcax
            cmp     al,'9'
            ja      dbtcax
            push    ax
            mov     ax,10
            mul     dx
            push    ax
            push    dx
            mov     ax,10
            mul     bx
            mov     bx,ax
            pop     dx
            add     bx,dx
            pop     dx
            pop     ax
            add     dx,ax
            adc     bx,0
            loop    dbtca2
dbtcax:     pop     ds
            pop     si
            pop     cx
            pop     ax
            ret
;
dbtwritepage:
            push    ax
            push    bx
            push    cx
```

TABLE 1-continued

Source Code Listings
Copyright © 1993 Borland International

```
            push    di
            push    es
            mov     cx,10
            mov     ax,word ptr es:[dbtblk + 2]
            mov     bx,word ptr es:[dbtblk]
            mov     es,[dbtbx]
            mov     di,[dbtdx]
            rcall   storedd
            pop     es
            pop     di
            pop     cx
            pop     bx
            pop     ax
            clc
            ret
;
anddb3:     nop
db3proc3    endp
db3         ends
            end page    60,132
            title   db3ndx
Copyright © 1993 Borland International
;
;include    db3ndx.pub
;
include     struc.inc
include     dstruc.inc
include     ndxstruc.inc
include     rcall.inc
include     sort.equ
include     memory.equ
include     file.equ
include     math.equ
include     date.equ
include     expdata.inc
include     expres.equ
include     error.equ
;
pagesize    equ     512
;
public
ndxuse,ndxopen,ndxtop,ndxbottom,ndxnext,ndxprev,ndxfindr
ec
public      ndxadd,ndxclose,ndxdel,ndxcreate,ndxcalc
public      ndxsearch,ndxmove,ndxfile,ndxdef,ndxzap
public      ndxinit,ndxinput,ndxexecute,ndxoutput,ndxexit
;
public      ndxcmpn,ndxcmpc
;
public      ndxcmpr
;
cseg        segment byte public
;
extrn       adjustbx:near
extrn       rwerr:near,readfname:near
cseg        ends
;
dseg        segment byte public
extrn       buffer:byte,ndxsize:word,uniflag:byte
extrn       dsmsg:word
extrn       set_foreign:byte
extrn       db3al:byte
extrn       transforeign:dword,clcptr:dword,stackcheck:dword
;
ndxuse      dw      ?       ;address of DBF description
dnxaddr     dw      ?       ;address of NDX description
ndxpofs     dw      ?       ;current page offset
ndxpseg     dw      ?       ;current page segment
ndx1ofs     dw      ?       ;1. page offset for split pages
ndx1seg     dw      ?       ;1. page segment for split pages
ndx2ofs     dw      ?       ;2. page offset for split pages
ndx2seg     dw      ?       ;2. page segment for split pages
ndx3ofs     dw      ?       ;3. page offset for split pages
```

TABLE 1-continued

Source Code Listings
Copyright © 1993 Borland International

```
ndx3seg      dw      ?              ;3. page segment for split pages
ndxleft      dw      ?,?            ;left page number for split page
ndxright     dw      ?,?            ;right page number for split page
ndxval       db 140  dup (?)        ;split page value
ndxcmpr      dw      ?              ;Compare dispatched call adress
ndxamem      dw      ?              ;Allocation size
ndxclen      dw      ?              ;Compare length
ndxname      dd      ?              ;Name adress of new .NDX file
ndxmax       dw      ?              ;Max. # of entries per page
(only used in indexing)
ndxseg       dw      ?              ;basic ndx segment
ndxofs       dw      ?
ndxoptr      dd      ?              ;ndx output pointer
dseg         ends
;
message      segment byte public
entrn        ext_ndx:byte
message      ends
;
db3          segment byte public
;
assume       cs:db3,ds:dseg
extrn        zerobuffer:near
;
db3proc2     proc    near
;
ndxinit:     push    bx
             push    cx
             push    dx
             push    si
             push    di
             push    es
             mov     es,[bx].ibuffer
             mov     es:[ndxptr],offset ndxtbl
             mov     ax,es:[ndxemax]
             mov     [ndxmax],ax
             mov     al,es:[ndxuniq]
             and     al,1
             or      es:[ndxstat],1
             mov     si,es:[ndxilen]
             add     si,4
             mov     bx,cs
             mov     di,offset ndxsortcmprn
             test    byte ptr es:[ndxtype],1
             jnz     ndxit1
             mov     di,offset ndxsortcomprc
ndxit1:      scall   sortinit
             pop     es
             pop     di
             pop     si
             pop     dx
             pop     cx
             pop     bx
             ret
;
ndxinput:
             push    cx
             push    dx
             push    si
             push    es
             mov     cx,word ptr [si].urecnum + 2
             mov     dx,word ptr [si].urecnum
             mov     es,[bx].ibuffer
             mov     si,offset ndxdata
             add     si,es:[ndxilen]
             mov     word ptr es:[si],dx
             mov     word ptr es:[si + 2],cx
             mov     si,offset ndxdata
             mov     dx,es
             scall   sortinput
             pop     es
             pop     si
             pop     dx
             pop     cx
             ret
;
ndxexecute:  push    bx
             push    si
             push    di
             push    es
             mov     [ndxaddr],bx
             mov     [ndxuse],si
             push    cx
             push    dx
             mov     dx,[bx].ibuffer
             call    getrootbegin
             pop     dx
             pop     cx
             jc      ndxexx
             mov     [ndx1ofs],di
             mov     [ndx1seg],es
             mov     es:[di].nbcntr,0
             or      byte ptr es:[di].nbflag,2
             mov     [ndxofs],offset nbdata
             add     [ndxofs],di
             scall   sortexecute
ndxexx:      pop     es
             pop     di
             pop     si
             pop     bx
             jc      ndxexy
             mov     cx,(pagesize * 8) / 16
             call    ndxaddmem
             clc
dnxexy:      ret
;
ndxoutput:
             push    bx
             push    cx
             push    dx
             push    si
             push    di
             push    es
             mov     [ndxaddr],bx
             mov     [ndxuse],si
             push    [bx].ibuffer
             pop     [ndxbseg]
dnxou1:      scall   sortoutput
             jnc     ndxou2
             jmp     ndxou11
dnxou2:      mov     es,[ndxbseg]
             mov     cx,es:[ndxilen]
             mov     ax,es:[ndxelen]
             add     si,cx
ndxou3:      mov     bx,[ndxmax]
             les     di,word ptr [ndx1ofs]
             cmp     es:[di].nbused,bx
             jz      ndxou4
             jmp     ndxou21
dnxou4:      mov     [ndx2ofs],di
             mov     [ndx2seg],es
             push    ax
             push    bx
             push    cx
             push    dx
             push    si
             push    di
             mov     cx,ax
             sub     cx,8
             dec     bx
             mul     bx
             add     ax,8
             add     di,ax
             lea     di,[di].nbdata
             mov     si,offset ndxval
ndxou5:      mov     al,es:[di]
             inc     di
```

TABLE 1-continued

Source Code Listings
Copyright © 1993 Borland International

```
            mov     byte ptr [si],al
            inc     si
            loop    ndxou5
            pop     di
            mov     dx,[ndxbseg]
            xor     cx,cx
            call    getemptypage
            pop     si
            pop     dx
            pop     cx
            pop     bx
            pop     ax
            jc      ndxou11
            mov     [ndx3ofs],di
            mov     [ndx3seg],es
            mov     [ndxofs],offset nbdata
            add     [ndxofs],di
            call    ndxoutmove
            mov     dx,[ndxbseg]
            mov     es,dx
            mov     bx,es:[ndxptr]
            call    ndxoutpage
            jc      ndxou11
            mov     es,dx
            mov     bx,es:[ndxptr]
            mov     ax,word ptr es:[bx].ntpage + 2
            mov     bx,word ptr es:[bx].ntpage
            call    getpage
            jc      ndxou11
            or      es:[di].ndflag,2
            mov     es:[di].nbcntr,0
            mov     [ndx1ofs],di
            mov     [ndx1seg],es
            clc
            jmp     ndxoux
ndxou11:    les     di,dword ptr [ndx1ofs]
            mov     es:[di].nbcntr,1
            or      ax,ax
            jz      ndxou12
            jmp     ndxou1x
ndxou12:    mov     dx,[ndxbseg]
            mov     es,dx
            mov     bx,offset ndxtbl
ndxou13:    add     bx,8
            cmp     bx,es:[ndxptr]
            jas     ndxou16
            push    bx
            push    es
            mov     ax,word ptr es:[bx].ntpage + 2
            mov     bx,word ptr es:[bx].ntpage
            call    getpage
            cmp     es:[di].nbused,0
            pop     es
            pop     bx
            jnz     ndxou13
            push    bx
            push    es
            push    word ptr es:[bx + 8].ntpage + 2
            push    word ptr es:[bx + 8].ntpage
            push    es:[ndxelen]
            mov     ax,word ptr es:[bx − 8].ntpage + 2
            mov     bx,word ptr es:[bx − 8].ntpage
            call    getpage
            pop     cx
            jnc     ndxou15
            add     sp,8
            stc
            jmp     short ndxou1x
ndxou15:    or      es:[di].nbflag,2
            mov     ax,es:[di].nbused
            push    dx
            mul     cx
            pop     dx
            add     ax,offset nbdata
            add     di,ax
            pop     word ptr es:[di]
```

TABLE 1-continued

Source Code Listings
Copyright © 1993 Borland International

```
            pop     word ptr es:[di + 2]
            pop     es
            pop     bx
            mov     di,bx
            lea     si,[bx + 8]
            mov     cx,pagesize
            sub     cx,si
            shr     cx,1
            cld
            push    ds
            push    es
            pop     ds
            rep     movsw
            pop     ds
            sub     es:[ndxptr],8
            sub     bx,8
            jmp     ndxou13
ndxou16:    xor     ax,ax
ndxou1x:    stc
            jmp     short ndxoux
ndxou21:    call    ndxoutmove
ndxoux:     pop     es
            pop     di
            pop     si
            pop     dx
            pop     cx
            pop     bx
            ret
;
ndxexit:    push    ax
            pushf
            call    ndxsubmem
            popf
            pop     ax
            scall   sortexit
            ret
;
ndxoutpage:
            les     di,word ptr [ndx3ofs]
            push    word ptr es:[di].nbpage
            push    word ptr es:[di].nbpage + 2
            mov     es,dx
            pop     word ptr es:[bx].ntpage + 2
            pop     word ptr es:[bx].ntpage
            mov     es:[bx].ntitem,0
            mov     es:[bx].ntresv,0
            cmp     bx,offset ndxtbl
            jnz     ndxpg0
            jmp     ndxpg21
ndxpg0:     sub     bx,8
            push    bx
            push    es:[ndxemax]
            mov     ax,word ptr es:[bx].ntpage + 2
            mov     bx,word ptr es:[bx].ntpage
            call    getpage
            pop     ax
            pop     bx
            jc      ndxpg0a
            cmp     es:[di].nbused,ax
            jnz     ndxpg1
            call    ndxpg11
            jnc     ndxpg1
ndxpg0a:    ret
ndxpg1:     cld
            or      es:[di].nbflag,2
            mov     es:[di].nbcntr,1
            inc     es:[di].nbused
            jz      ndxpg4
            push    ds
            mov     ds,dx
            mov     cx,ds:[ndxelen]
            pop     ds
            push    ds
            lda     si,dword ptr [ndx2ofs]
            mov     ds:[si].nbcntr,1
            mov     ax,es:[di].nbused
```

TABLE 1-continued

Source Code Listings
Copyright © 1993 Borland International

```
            add     di,offset nbdata
            dec     ax
            push    dx
            mul     cx
            pop     dx
            or      ax,ax
            jnz     ndxpg2
            mov     ax,word ptr ds:[si].nbpage
            stosw
            mov     ax,word ptr ds:[si].nbpage + 2
            stosw
            jmp     short ndxpg3
ndxpg2:     add     di,ax
            add     di,4
ndxpg3:     xor     ax,ax
            stosw
            stosw
            pop     ds
            call    ndxpmove
            push    ds
            lds     si,word ptr [ndx3ofs]
            mov     ds:[si].nbcntr,1
            lea     si,[si].nbpage
            movsw
            movsw
            pop     ds
            clc
            jmp     short ndxpgx
ndxpg4:     push    di
            push    es
            les     di,dword ptr [ndx2ofs]
            mov     es:[di].nbcntr,1
            les     di,dword ptr [ndx3ofs]
            mov     es:[di].nbcntr,1
            pop     es
            pop     di
ndxpgx:     ret
;
ndxpg11:    mov     es:[di].nbcntr,0            ;down with recursion
            mov     cx,es
            mov     si,di
            mov     es,dx
            mov     ax,es:[ndxcntr]
            push    bx
            les     di,word ptr [ndx3ofs]
            push    word ptr es:[di].nbpage
            push    word ptr es:[di].nbpage + 2
            mov     es:[di].nbcntr,ax
            les     di,dword ptr [ndx2ofs]
            push    word ptr es:[di].nbpage
            push    word ptr es:[di].nbpage + 2
            mov     es:[di].nbcntr,ax
            mov     [ndx2ofs],si
            mov     [ndx2seg],cx
            xor     cx,cx
            call    getemptypage
            jc      ndxpg12
            mov     es:[di].nbused,0ffffh
            mov     [ndx3ofs],di
            mov     [ndx3seg],es
            push    word ptr es:[di].nbpage
            push    word ptr es:[di].nbpage + 2
            call    ndxoutpage
            pop     cx
            pop     si
            jc      ndxpg12
            pop     ax
            pop     bx
            call    getpage
            jc      ndxpg13
            mov     [ndx2ofs],di
            mov     [ndx2seg],es
            mov     es:[di].nbcntr,0
            pop     ax
            pop     bx
            call    getpage
            jc      ndxpg14
            mov     [ndx3ofs],di
            mov     [ndx3seg],es
            mov     es:[di].nbcntr,0
            mov     ax,cx
            mov     bx,si
            call    getpage
            jc      ndxpg14
            pop     bx
            cmp     bx,offset ndxtbl
            jnz     ndxpg1x
            add     bx,8
ndxpg1x:    clc
            ret
ndxpg12:    add     sp,4
ndxpg13:    add     sp,4
ndxpg14:    add     sp,2
            stc
            ret
;
ndxpg21:    mov     es,dx                       ;new root page
            mov     di,offset ndxend - 2
            std
ndxpg22:    mov     ax,es:[di - 8]
            stosw
            cmp     di,offset ndxtbl
            jnz     ndxpg22
            cld
            add     es:[ndxptr],8
            push    es:[ndxelen]
            xor     cx,cx
            call    getemptypage
            pop     cx
            jc      ndxpg2x
            mov     es:[di].nbcntr,1
            push    ds
            mov     ds,dx
            mov     ax,word ptr es:[di].nbpage
            mov     word ptr ds:[ndxroot],ax
            mov     word ptr ds:[ndxtbl].ntpage,ax
            mov     ax,word ptr es:[di].nbpage + 2
            mov     word ptr ds:[ndxroot + 2],ax
            mov     word ptr ds:[ndxtbl].ntpage + 2,ax
            mov     ds:[ndxtbl].ntitem,0
            mov     ds:[ndxtbl].ntresv,0
            pop     ds
            lea     di,[si].nbused
            mov     ax,1
            stosw
            xor     ax,ax
            stosw
            push    ds
            lds     si,dword ptr [ndx2ofs]
            mov     ds:[si].nbcntr,1
            mov     ax,word ptr [si].nbpage
            stosw
            mov     ax,word ptr [si].nbpage + 2
            stosw
            xor     ax,ax
            stosw
            stosw
            pop     ds
            call    ndxpmove
            push    ds
            lds     si,dword ptr [ndx3ofs]
            mov     ds:[si].nbcntr,1
            lea     si,[si].nbpage
            movsw
            movsw
            pop     ds
ndxpg2x:    ret
;
ndxpmove:
            cld
            mov     si,offset ndxval
```

TABLE 1-continued

Source Code Listings
Copyright © 1993 Borland International

```
              sub       cx,8
              rep       movsb
              ret
;
ndxoutmove:                     ;ax = elen
                                ;cx = ilen
                                ;dx:si = pointer to recno( )
                                ;es:di = target page
                                ;[ndxofs] = target offset
              inc       es:[di].nbused
              mov       di,[ndxofs]
              add       [ndxofs],ax
              cld
              sub       ax,4
              sub       ax,cx
              push      ax
              push      ds
              mov       ds,dx
              xor       ax,ax
              stosw
              stosw
              mov       ax,ds:[si]
              stosw
              mov       ax,ds:[si + 2]
              stosw
              sub       si,cx
              rep       movsb
              pop       ds
              pop       cx
              xor       al,al
              rep       stosb
              ret
;
ndxsortcmprn  proc far
              mthcall   memu_compare
              ret
ndxsortcmprn  endp
;
ndxsortcmprc  proc far
              push      cx
              push      si
              push      di
              cld
              sub       cx,4
              push      ds
              mov       ds,dx
              rep       cmpsb
              pop       ds
              pop       di
              pop       si
              pop       cx
              ret
ndxsortcmprc  endp
;
ndxfile:      push      bx
              push      si
              push      es
              mov       es,[bx].ibuffer
              mov       bx,es:[ndxhand]
              mov       cx,[dsmsg]
              mov       dx,offset ext_ndx
              fcall     filetruename
              mov       cx,ds
              mov       dx,si
              pop       es
              pop       si
              pop       bx
              clc
              ret
;
ndxdef:       mov       cx,[bx].ibuffer
              mov       dx,offset ndxexpr
              clc
              ret
;
ndxcalc:      push      dx
```

TABLE 1-continued

Source Code Listings
Copyright © 1993 Borland International

```
              push     di
              push     es
              push     [si].uorder
              push     [bx].istatus
              xor      dx,dx
              mov      ax,bx
              sub      ax,si
              sub      ax,offset uindex
              mov      cx,offset iend
              div      cx
              inc      ax
              mov      [si].uorder,ax
              or       [bx].istatus,1
              mov      es,[bx].ibuffer
              les      di,es:[ndxcptr]
              call     [clcptr]
              pop      [bx].istatus
              pop      [si].uorder
              pop      es
              pop      di
              pop      dx
              ret
;
ndxmove:      push     bx
              push     cx
              push     dx
              push     si
              push     di
              push     es
              mov      al,[db3al]
              mov      [ndxuse],si
              mov      es,[bx].ibuffer
              mov      di,offset ndxdata
              test     es:[ndxtype],1
              jnz      ndxmo21
              cmp      al,chr_nmacro
              jz       ndxmo1
              jmp      ndxmo31
ndxmo1:       cld
              cmp      [set_foreign],0
              jz       ndxmo12
              push     si
              push     ds
              mov      si,dx
              mov      dx,cx
              mov      cx,es:[ndxilen]
ndxmo11:      push     es
              mov      es,dx
              mov      al,es:[si]
              inc      si
              pop      es
              call     [transforeign]
              or       al,al
              jz       ndxmo14
              stosb
              loop     ndxmo11
              jmp      short ndxmo15
ndxmo12:      push     si
              push     ds
              mov      ds,cx
              mov      si,dx
              mov      cx,es:[ndxilen]
ndxmo13:      lodsb
              or       al,al
              jz       ndxmo14
              stosb
              loop     ndxmo13
              jmp      short ndxmo15
ndxmo14:      push     cx
              mov      al,' '
              rep      stosb
              pop      cx
ndxmo15:      not      cx
              add      cx,es:[ndxilen]
              inc      cx
              mov      es:[ndxilen],cx
```

TABLE 1-continued

Source Code Listings
Copyright © 1993 Borland International

```
                pop     ds
                pop     si
                clc
                jmp     short ndxmo33
ndxmo21:        cmp     al,date__int
                jnz     ndxmo22
                dtecall dconv__date2dd
                mov     al,num__dd__sgn
ndxmo22:        and     al,mask__nodate
                cmp     al,num__dfloat
                jz      ndxmo23
                cmp     al,num__dd__sgn
                jnz     ndxmo31
                push    di
                push    es
                mov     al,1
                mthcall mconv__dds2ieee
                mov     cx,es
                mov     dx,di
                pop     es
                pop     di
ndxmo23:        push    si
                push    ds
                mov     ds,cx
                mov     si,dx
                mov     cx,4
                cld
                rep     movsw
                pop     ds
                pop     si
                mov     es:[ndxslen],8
                clc
                jmp     short ndxmo33
ndxmo31:        mov     ax,271
ndxmo32:        push    ax
                xor     al,al
                mov     cx,es:[ndxilen]
                mov     di,offset ndxdata
                cld
                rep     stosb
                pop     ax
                stc
ndxmo33:        pop     es
                pop     di
                pop     si
                pop     dx
                pop     cx
                pop     bx
                ret
;
ndxsetcmp:
                push    es
                mov     es,dx
                test    es:[ndxtype],1
                jnz     ndxsc1
                test    [db3al],1
                jz      ndxsc2
                push    word ptr es:[ndxilen]
                pop     [ndxclen]
                mov     word ptr [ndxcmpr],offset ndxcmpc
                jmp     short ndxscx
ndxsc1:         mov     word ptr [ndxcmpr],offset ndxcmpm
                jmp     short ndxscx
ndxsc2:         push    word ptr es:[ndxslen]
                pop     [ndxclen]
                mov     word ptr [ndxcmpr],offset ndxcmpc0
                jmp     short ndxscx
dnxscx:         pop     es
                ret
;
ndxsearch:
                push    bx
                push    si
                push    di
                push    es
                mov     [ndxaddr],bx
                mov     [ndxuse],si
                mov     dx,[bx].ibuffer
                call    ndxsetcmp
                call    getrootbegin
ndxse1:         jnc     ndxse1a
                jmp     ndxsex
ndxse1a:        jz      ndxse7          ;ndxse11
                mov     cx,es:[di].nbused
                jcxz    ndxse7          ;ndxse11
                lea     di,[di].nbdata
ndxse2:         call    [ndxcmpr]
                jbe     ndxse3
                push    es
                mov     es,dx
                add     di,es:[ndxelen]
                mov     si,es:[ndxptr]
                inc     es:[si].ntitem
                pop     es
                loop    ndxse2
                mov     ax,word ptr es:[di + 2]
                mov     bx,word ptr es:[di]
                or      bx,bx
                jnz     ndxse4
                or      ax,ax
                jz      ndxse7          ;ndxse11
ndxse3:         mov     ax,word ptr es:[di + 2]
                mov     bx,word ptr es:[di]
                or      bx,bx
                jnz     ndxse4
                or      ax,ax
                jz      ndxse5
ndxse4:         call    stepdownleft
                jmp     short ndxse1
ndxse5:         call    [ndxcmpr]
                jz      ndxse6          ;check for various search flags
                ja      ndxse7          ;ndxse11
                test    [db3al],2
                jz      ndxse7          ;ndxse11
ndxse6:         mov     ax,word ptr es:[di + 6]
                mov     bx,word ptr es:[di + 4]
                or      bx,bx
                jnz     ndxse12
                or      ax,ax
                jnz     ndxse12
ndxse7:         jmp     short ndxse11
ndxse9:         mov     di,[ndxpofs]
                mov     es:[di].nbcntr,1
                mov     es,dx
                cmp     es:[ndxhigh],0
                jz      ndxse11
                dec     es:[ndxhigh]
                sub     es:[ndxptr],8
                mov     si,es:[ndxptr]
                mov     ax,word ptr es:[si].ntpage + 2
                mov     bx,word ptr es:[si].ntpage
                inc     es:[si].ntitem
                mov     cx,es:[si].ntitem
                call    getpage
                jc      ndxsex
                call    setndxtbl
                jc      ndxsex
                cmp     es:[di].nbused,cx
                jc      ndxse12
                mov     ax,cx
                mov     cx,es:[di].nbused
                sub     cx,ax
                inc     cx
                push    dx
                push    es
                mov     es,dx
                mul     es:[ndxelen]
                add     di,ax
                add     di,offset nbdata
                pop     es
                pop     dx
```

TABLE 1-continued

Source Code Listings
Copyright © 1993 Borland International

```
              jmp       ndxse2
ndxse11:      xor       cx,cx
              xor       dx,dx
              mov       ax,0ff00h
              jmp       short ndxsex
ndxse12:      mov       cx,ax
              mov       dx,bx
              xor       ax,ax
ndxsex:       pop       es
              pop       di
              pop       si
              pop       bx
              ret
;
ndxzap:                 ;ds:si = database
                        ;ds:bx = index
              push      bx
              push      dx
              push      si
              push      di
              push      es
              mov       [ndxaddr],bx
              mov       [ndxuse],si
              mov       es,[bx].ibuffer
              xor       ax,ax
              mov       word ptr es:[ndxroot],1
              mov       word ptr es:[ndxroot + 2],ax
              mov       word ptr es:[ndxpage],2
              mov       word ptr es:[ndxpage + 2],ax
              mov       es:[ndxstat],1
              mov       es:[ndxptr],0
              mov       es:[ndxcntr],1
              mov       bx,es:[ndxhand]
              xor       al,al
              xor       cx,cx
              mov       dx,pagesize
              fcall     fileseek
              jc        ndxzax
              fcall     filetruncate
              jc        ndxzax
              mov       cx,pagesize / 2
              call      zerobuffer
              push      di
              push      es
              mov       di,offset buffer
              mov       cx,pagesize
              push      ds
              pop       es
              fcall     filewrite
              pop       es
              pop       di
              jc        ndxzax
              mov       es,es:[ndxbptr]
ndxza1:       mov       cx,es:[nbnum]
              xor       di,di
ndxza2:       mov       es:[di].nbflag,0
              add       di,offset pagesize + 16
              loop      ndxza2
              mov       cx,es:[nbnext]
              jcxz      ndxzax
              mov       es,cx
              jmp       short ndxza1
ndxzax:       pop       es
              pop       di
              pop       si
              pop       dx
              pop       bx
              ret
;
ndxcreate:
              push      bx
              push      dx
              push      si
              push      di
              push      es
              mov       [ndxaddr],bx
```

TABLE 1-continued

Source Code Listings
Copyright © 1993 Borland International

```
              mov       [ndxuse],si
              push      cx
              mov       cx,pagesize / 2
              call      zerobuffer
              pop       cx
              mov       byte ptr [buffer].ndxtype,0ffh
              mov       al,[db3al]
              mov       [buffer].ndxuniq,al
              mov       [bx].icofs,ax
              mov       [bx].icseg,ax
              mov       [bx].ibuffer,ax
              push      cx
              push      si
              push      di
              push      ds
              push      es
              push      ds
              pop       es
              mov       ds,cx
              mov       si,dx
              mov       di,offset buffer + ndxexpr
              mov       cx,255
              cld
ndxcr1:       lodsb
              stosb
              or        al,al
              jz        ndxcr2
              loop      ndxcr1
ndxcr2:       xor       al,al
              stosb
              pop       es
              pop       ds
              pop       di
              pop       si
              pop       cx
              push      dx
              push      si
              mov       dx,ds
              mov       si,offset buffer + ndxexpr
              call      genndx
              pop       si
              pop       dx
              jc        ndxcr22
              push      dx
              xor       bx,bx
              mov       al,10h
              mov       cx,[dsmsg]
              mov       dx,offset ext_ndx
              fcall     filecreate
              pop       dx
              jnc       ndxcr23
ndxcr22:      xor       bx,bx
              jmp       ndxcrerr
ndxcr23:      push      di
              push      es
              mov       di,offset buffer
              mov       cx,pagesize
              push      ds
              pop       es
              fcall     filewrite
              pop       es
              pop       di
              jc        ndxcr25      ;dnxcrerr
              call      allcndxbuffer
              jc        ndxcr25      ;ndxcrerr
              mov       es:[ndxilen],199
              push      bx
              push      si
              mov       bx,[ndxaddr]
              mov       si,[ndxuse]
              call      ndxcalc
              pop       si
              pop       bx
              jc        ndxcr25      ;ndxcrerr
              mov       cx,es:[ndxslen]
              cmp       cx,118
```

TABLE 1-continued

Source Code Listings
Copyright © 1993 Borland International

```
            jae      ndxcr24
            or       cx,cx
            jnz      ndxcr26
ndxcr24:    mov      ax,379
ndxcr25:    jmp      short ndxcrerr
ndxcr26:    mov      es:[ndxilen],cx
ndxcr27:    test     cx,3
            jz       ndxcr28
            inc      cx
            jmp      chort ndxcr27
ndxcr28:    add      cx,8
            mov      es:[ndxelen],cx
            mov      ax,pagesize - 8
            push     dx
            xor      dx,dx
            div      cx
            pop      dx
            mov      word ptr es:[ndxemax],ax
            mov      word ptr es:[ndxroot],1
            mov      word ptr es:[ndxpage],2
            mov      es:[ndxstat],1
            mov      cx,pagesize / 2
            call     zerobuffer
            push     di
            push     es
            mov      di,offset buffer
            mov      cx,pagesize
            push     ds
            pop      es
            fcall    filewrite
            pop      es
            pop      di
            jc       ndxcrerr
            mov      es:[ndxstat],1
            jmp      ndxop3
ndxcrerr:
            push     ax
            mov      si,[ndxaddr]
            mov      cx,[si].icseg
            jcxz     ndxcrex
            mov      es,cx
            mcall    mdeallocate
            mov      [si].icseg,0
            mov      [si].icofs,0
            or       bx,bx
            jz       ndxcrex
            fcall    fileclosedel
            mov      cx,[si].ibuffer
            jcxz     ndxcrex
            mov      es,cx
            mcall    mdeallocate
            mov      [si].ibuffer,0
ndxcrex:    mov      [si].istatus,0
            pop      ax
            pop      es
            pop      di
            pop      si
            pop      dx
            pop      bx
            stc
            ret
;
ndxaddmem:
            push     bx
            push     dx
            push     di
            push     es
            mov      [ndxamem],cx
            mov      ax,cx
            mov      es,[bx].ibuffer
            mov      es,es:[ndxbptr]
ndxam1:     cmp      ax,1000h
            jc       ndxam2
            mov      ax,1000h
            jmp      short ndxam3
ndxam2:     cmp      ax,(pagesize + 16) / 16
```

TABLE 1-continued

Source Code Listings
Copyright © 1993 Borland International

```
            jc       ndxamx
ndxam3:     xor      dx,dx
            mov      bx,(pagesize + 16) / 16
            div      bx
            push     ax
            mul      bx
            sub      [ndxamem],ax
            mov      bx,ax
            mcall    mallocate
            pop      bx
            jc       ndxamx
            xor      di,di
            mov      cx,es:[nbnum]
ndxam4:     mov      es:[di].nbnext,ax
            add      di,pagesize + 16
            loop     ndxam4
            mov      es,ax
            mov      cx,bx
            xor      di,di
ndxam5:     mov      es:[di].nbflag,0
            mov      es:[di].nbcntr,0
            mov      es:[di].nbnext,0
            mov      es:[di].nbnum,bx
            add      di,pagesize + 16
            loop     ndxam5
            sub      [ndxamem],2
            jc       ndxamx
            mov      ax,[ndxamem]
            jmp      short ndxam1
ndxamx:     pop      es
            pop      di
            pop      dx
            pop      bx
            clc
            ret
;
ndxsubmem;
            push     bx
            push     dx
            push     di
            push     es
            mov      es,[bx].ibuffer
            mov      es,es:[ndxbptr]
            mov      ax,es:[nbnext]
            or       ax,ax
            jz       ndxsmx
            mov      cx,es:[nbnum]
            xor      di,di
ndxsm1:     mov      es:[di].nbnext,0
            add      di,pagesize + 16
            loop     ndxsm1
ndxsm2:     mov      es,ax
            mov      cx,es:[nbnum]
            xor      di,di
            mov      dx,[bx].ibuffer
ndxsm3:     call     savepage
            add      di,pagesize + 16
            loop     ndxsm3
            push     es:[nbnext]
            mcall    mdeallocate
            pop      ax
            or       ax,ax
            jnz      ndxsm2
ndxsmx:     clc
            pop      es
            pop      di
            pop      dx
            pop      bx
            ret
;
ndxopen:             ;ds:si = database
                     ;ds:bx = index
            push     bx
            push     dx
            push     si
            push     di
```

TABLE 1-continued

Source Code Listings
Copyright © 1993 Borland International

```
              push    es
              mov     [ndxaddr],bx
              mov     [ndxuse],si
              xor     bx,bx
              mov     cx,[dsmsg]
              mov     dx,offset est_ndx
              mov     al,12h
              fcall   fileopenrw
              jnc     ndxop0
              jmp     ndxopx
ndxop0:       pop     es
              pop     ax
              push    di
              push    es
              mov     di,offset buffer
              mov     cx,512
              push    ds
              pop     es
              fcall   filereadcheck
              jc      ndxop1         ;ndxop13
              push    dx
              push    si
              mov     dx,ds
              mov     is,offset buffer + ndxexpr
              call    genndx
              pop     si
              pop     dx
              jnc     ndxop2
ndxop1:       jmp     short ndxop13
ndxop2:       call    allcndxbuffer
              jc      ndxop12
              mov     es:[ndxstat],0
ndxop3:       mov     es:[ndxptr],offset ndxtbl
              mov     es:[ndxallc],offset ndxend
              mov     es:[ndxcntr],0
              mov     es:[ndxhand],bx
              mov     es:[ndxhigh],0
              mov     ax,[ndxsize]
              call    ndxinitbuff
              jc      ndxop11
              mov     es:[ndxbptr],ax
              mov     cl,byte ptr es:[ndxtype]
              mov     al,40h
              shl     al,cl
              mov     si,[ndxaddr]
              mov     byte ptr [si].istatus + 1,al
              jmp     short ndxopx
ndxop11:      push    ax
              mov     si,[ndxaddr]
              mov     es,[si].icseg
              mcall   mdeallocate
              pop     ax
ndxop12:      push    ax
              mov     si,[ndxaddr]
              mov     es,[si].ibuffer
              mcall   mdeallocate
              pop     ax
ndxop13:      push    ax
              fcall   fileclose
              pop     ax
              stc
ndxopx:       pop     es
              pop     di
              pop     si
              pop     dx
              pop     bx
              ret
;
allcndxbuffer:
              push    bx
              mov     bx,offset ndxend
              rcall1  adjustbx
              mcall   mallocate
              pop     bx
              jc      ndxop12
              mov     si,[ndxaddr]
              mov     [si].ibuffer,ax
              mov     es,ax
              mov     si,offset buffer
              xor     di,di
              mov     cx,offset ndxdata
              cld
              rep     movsb
              ret
;
ndxclose:
              push    bx
              push    dx
              push    si
              push    di
              push    es
              mov     [ndxaddr],bx
              mov     dx,[bx].ibuffer
              mov     es,dx
              mov     cx,es:[ndxbptr]
ndxc11:       jcxz    ndxc15
              xor     di,di
              mov     es,cx
              mov     cx,es:[nbnum]
              jcxz    ndxc14
ndxc12:       call    savepage
ndxc13:       add     di,pagesize + 16
              loop    ndxc12
ndxc14:       mov     cx,es:[nbnext]
              push    cx
              mcall   mdeallocate
              pop     cx
              jmp     short ndxc11
ndxc15:       mov     es,dx
              mov     bx,es:[ndxhand]
              test    es:[ndxstat],1
              jz      ndxc16
              fcall   fileseekbegin
              push    di
              xor     di,di
              mov     cx,offset ndxexpr
              fcall   filewrite
              pop     di
ndxc16:       fcall   fileclose
              mcall   mdeallocate
              mov     bx,[ndxaddr]
              mov     es,[bx].icseg
              mcall   mdeallocate
              lea     di,[bx].istatus
              mov     cx,offset iend
              push    ds
              pop     es
              xor     al,al
              cld
              rep     stosb
              pop     es
              pop     di
              pop     si
              pop     dx
              pop     bx
              ret
;
prepvalue:
              push    es
              mov     es,dx
              test    es:[ndxtype],1
              jnz     prepv1
              mov     [ndxcmpr].offset ndxcmpc
              pop     es
              ret
prepv1:       mov     [ndxcmpr].offset ndxcmpn
              pop     es
              ret
;
ndxcmpc0:
              push    cx
              push    si
```

TABLE 1-continued

Source Code Listings
Copyright © 1993 Borland International

```
              push    di
              push    ds
              mov     cx,[ndxclen]
              mov     ds,dx
              jmp     short ndxcc1
;
ndxcmpc:              ;index >= buffer jbe
                      ;index >  buffer jb
                      ;index =  buffer jz
                      ;index <  buffer ja
              push    cx
              push    si
              push    di
              push    ds
              mov     ds,dx
              mov     cx,ds:[ndxilen]
ndxcc1:       add     di,8
              mov     si,offset ndxdata
              cld
              rep     cmpsb
              pop     ds
              pop     di
              pop     si
              pop     cx
              ret
;
ndxcmpn:      push    si
              push    di
              mov     si,offset ndxdata
              add     di,8
              mthcall memu_compare
              pop     di
              pop     si
              ret
;
ndxdel:       push    bx
              push    cx
              push    dx
              push    si
              push    di
              push    es
              mov     [ndxaddr],bx
              mov     [ndxuse],si
              mov     dx,[bx].ibuffer
ndxde1:       call    getptrpage
              jnc     ndxde1a
              jmp     ndxdex
ndxde1a:      jnz     ndxde1b
              jmp     ndxde11
ndxde1b:      cmp     es:[di].nbdata,0
              jz      ndxde1d
ndxde1c:      jmp     ndxde7
ndxde1d:      cmp     es:[di].nbdata,0
              jnz     ndxde1c ;ndxde7
              cmp     es:[di].nbused,1        ;record reference
              jz      ndxde3
              cmp     es:[di].nbused,cx
              ja      ndxde1e
              jmp     ndxde11
ndxde1e:      push    cx
              inc     cx
              cmp     es:[di].nbused,cx
              pop     cx
              jz      ndxde5
ndxde2:       dec     es:[di].nbused
              mov     bx,es:[di].nbused
              sub     bx,cx
              mov     di,si
              add     si,ax
              push    dx
              mul     bx
              pop     dx
              mov     cx,ax
              add     cx,4
              cld
              push    ds
              push    es
              pop     ds
              rep     movsb
              pop     ds
              jmp     ndxde12
ndxde3:       call    ndxfree                 ;remove whole page
              mov     es,dx
              cmp     es:[ndxhigh],0
              jz      ndxde6b ;ndxde12
              dc      es:[ndxhigh]
              sub     es:[ndxptr],8
              jmp     short ndxde1
ndxde4:       sub     si,ax
ndxde5:       dec     es:[di].nbused          ;remove last entry
              sub     si,ax
              add     si,8
              mov     es:[di].nbcntr,0
              mov     [ndxlofs],di
              mov     [ndx1seg],es
              mov     es,dx
              cmp     es:[ndxhigh],0
              jz      ndxde6
              dec     es:[ndxhigh]
              sub     es:[ndxptr],8
              push    es:[ndxilen]
              push    si
              call    getptrpage
              pop     bx
              pop     ax
              jc      ndxde6
              jz      ndxde6a ;ndxde11
              cmp     cx,es:[di].nbused
              jz      ndxde6
              or      es:[di].nbflag,2
              mov     di,si
              add     di,8
              mov     si,bx
              mov     cx,ax
              push    ds
              mov     ds,[ndx1seg]
              cld
              rep     movsb
              pop     ds
ndxde6:       mov     es,dx
              push    es:[ndxcntr]
              les     di,dword ptr es:[ndxlofs]
              pop     es:[di].nbcntr
              jc      ndxde6c ;ndxdex
              jmp     ndxde12
ndxde6a:      jmp     short ndxde11
ndxde6b:      jmp     short ndxde12
ndxde6c:      jmp     short ndxdex
ndxde7:       cmp     es:[di].nbused,1        ;page reference
              jz      ndxde8
              cmp     es:[di].nbused,cx
              jnz     ndxde7a
              jmp     ndxde4
ndxde7a:      push    cx
              inc     cx
              cmp     es:[di].nbused,cx
              pop     cx
              jz      ndxde7b
              jmp     ndxde2
ndxde7b:      push    word ptr es:[si]
              push    word ptr es:[si + 2]
              sub     si,ax
              pop     word ptr es:[si + 2]
              pop     word ptr es:[si]
              jmp     ndxde5
ndxde8:       call    ndxfree
              and     cx,1
              xor     cx,1
              push    dx
```

TABLE 1-continued

Source Code Listings
Copyright © 1993 Borland International

```
              mul      cx
              pop      dx
              add      ax,offset nbdata
              mov      bx,word ptr es:[di]
              mov      ax,word ptr es:[di + 2]
              mov      es,di
              cmp      es:[ndxhigh],0
              jnz      ndxde9
              mov      word ptr es:[ndxroot],bx
              mov      word ptr es:[ndxroot + 2],ax
              or       es:[ndxstat],1
              jmp      short ndxde12
ndxde9:       push     ax
              push     bx
              call     getptrpage
              pop      bx
              pop      cx
              jc       ndxdex
              jz       ndxde11
              mov      word ptr es:[si],bx
              mov      word ptr es:[si + 2],cx
              jmp      short ndxde12
ndxde11:      mov      ax,0ff00h
              clc
              jmp      short ndxdex
ndxde12:      xor      ax,ax
ndxdex:       pop      es
              pop      di
              pop      si
              pop      dx
              pop      cx
              pop      bx
              ret
;
ndxfree:      mov      es:[di].nbused,0           ;empty page
maintance
              ret
;
getprtpage:                        ;ax     = ndxelen
                                   ;cx     = ntitem
                                   ;es:si  = pointer to entry
                                   ;es:di  = pointer to page
              mov      es,dx
              mov      si,es:[ndxptr]
              mov      bx,word ptr es:[si].ntpage
              mov      ax,word ptr es:[si].ntpage + 2
              mov      cx,word ptr es:[si].ntitem
              mov      si,es:[ndxelen]
              call     getpage
              jc       ndxptx
              cmp      es:[di].nbused,0
              jz       ndxpt1
              or       es:[di].nbflag,2
              mov      ax,si
              push     dx
              mul      cx
              pop      dx
              add      ax,offset nbdata
              add      ax,di
              xchg     si,ax
              clc
              ret
ndxpt1:       xor      ax,ax
ndxptx:       ret
;
ndxadd:       push     bx
              push     cx
              push     dx
              push     si
              push     di
              push     es
              mov      [ndxaddr],bx
              mov      [ndxuse],si
              mov      dx,[bx].ibuffer
              call     prepvalue
ndxad1:       call     getrootend
```

```
ndxad2:       jnc      ndxad3
              jmp      ndxadx
ndxad3:       jnz      ndxad4
              jmp      ndxad21
ndxad4:       mov      cx,es:[di].nbused
              jcxz     ndxad10
              push     dx
              push     es
              mov      es,dx
              mov      ax,es:[ndxelen]
              mul      cx
              sub      ax,es:[ndxelen]
              pop      es
              pop      dx
              add      di,ax
              add      di,offset nbdata
ndxad5:       call     [ndxcmpr]
              jae      ndxad6
              push     es
              mov      es,dx
              sub      di,es:[ndxelen]
              mov      si,es:[ndxptr]
              dec      es:[si].ntitem
              pop      es
              loop     ndxad5
ndxad6:       pushf
              push     es
              mov      es,dx
              add      di,es:[ndxelen]
              pop      es
              mov      ax,word ptr es:[di + 2]
              mov      bx,word ptr es:[di]
              or       bx,bx
              jnz      ndxad7
              or       ax,ax
              jz       ndxad8
ndxad7:       popf
              call     stepdownright
              jmp      ndxad2
ndxad8:       popf
              jne      ndxad11
              jcxz     ndxad11
              push     es
              mov      es,dx
              test     es:[ndxuniq],1
              pop      es
              jz       ndxad11
              jmp      ndxad22
ndxad10:      mov      si,[ndxpofs]
              lea      di,[di].nbdata
              jmp      short ndxad12
ndxad11:      mov      si,[ndxpofs]
              push     es
              mov      es,dx
              mov      ax,es:[ndxemax]
              pop      es
              cmp      es:[si].nbused,ax
              jnz      ndxad12
              mov      di,si
              call     splitpage
              jc       ndxadx
              jmp      ndxad1
ndxad12:      mov      ax,es:[si].nbused
              not      cx
              add      cx,ax
              inc      cx
              inc      es:[si].nbused
              or       es:[si].nbflag,2
              push     dx
              push     es
              mov      es,dx
              mov      bx,es:[ndxelen]
              mul      bx
              xchg     cx,ax
              mul      bx
              pop      es
```

TABLE 1-continued

Source Code Listings
Copyright © 1993 Borland International

```
              pop     dx
              lea     si,[si].nbdata + 3
              add     si,cx
              mov     di,si
              mov     cx,ax
              add     cx,4
              push    ds
              push    es
              pop     ds
              add     di,bx
              std
              rep     movsb
              pop     ds
              mov     di,si
              inc     di
              cld
              xor     ax,ax
              stosw
              stosw
              mov     si,[ndxuse]
              mov     ax,word ptr [si].urecnum
              stosw
              mov     ax,word ptr [si].urecnum + 2
              stosw
              push    ds
              mov     ds,dx
              mov     si,offset ndxdata
              mov     cx,ds:[ndxilen]
              rep     movsb
              pop     ds
              jmp     short ndxad22
ndxad21:      mov     ax,0ff00h
              clc
              jmp     short ndxadx
ndxad22:      xor     ax,ax
ndxadx:       pop     es
              pop     di
              pop     si
              pop     dx
              pop     cx
              pop     bx
              ret
;
ndxfindrec:
              push    bx
              push    cx
              push    dx
              push    si
              push    di
              push    es
              mov     [ndxaddr],bx
              mov     [ndxuse],si
              mov     dx,[bx].ibuffer
              call    prepvalue
              call    getrootbegin
ndxfr1:       jnc     ndxfr1a
              jmp     ndxfrx
ndxfr1a:      jz      ndxfr6          ;ndxfr11
              mov     cx,es:[di].nbused
              jcxz    ndxfr6          ;ndxfr11
              lea     di,[di].nbdata
ndxfr2:       call    [ndxcmpr]
              jbe     ndxfr3
              push    es
              mov     es,dx
              add     di,es:[ndxelen]
              mov     si,es:[ndxptr]
              inc     es:[si].ntitem
              pop     es
              loop    ndxfr2
              mov     ax,word ptr es:[di + 2]
              mov     bx,word ptr es:[di]
              or      bx,bx
              jnz     ndxfr4
              or      ax,ax
              jz      ndxfr6          ;ndxfr11
```

TABLE 1-continued

Source Code Listings
Copyright © 1993 Borland International

```
ndxfr3:       mov     ax,word ptr es:[di + 2]
              mov     bx,word ptr es:[di]
              or      bx,bx
              jnz     ndxfr4
              or      ax,ax
              jz      ndxfr5
ndxfr4:       call    stepdownleft
              jmp     short ndxfr11
ndxfr5:       call    [ndxcmpr]
              jnz     ndxfr6          ;ndxfr11
              mov     ax,word ptr es:[di + 6]
              mov     bx,word ptr es:[di + 4]
              or      bx,bx
              jnz     ndxfr7
              or      ax,ax
              jnz     ndxfr7
ndxfr6:       jmp     ndxfr11
ndxfr7:       push    si
              mov     si,[ndxuse]
              cmp     bx,word ptr [si].urecnum
              jnz     ndxfr8
              cmp     ax,word ptr [si].urecnum + 2
ndxfr8:       pop     si
              jz      ndxfr12
              push    es
              mov     es,dx
              add     di,es:[ndxelen]
              mov     si,es:[ndxptr]
              inc     es:[si].ntitem
              pop     es
              loop    ndxfr5
ndxfr9:       mov     di,[ndxpofs]
ndxfr10:      mov     es:[di].nbcntr,1
              mov     es,dx
              cmp     es:[ndxhigh],0
              jz      ndxfr11
              dec     es:[ndxhigh]
              sub     es:[ndxptr],8
              mov     si,es:[ndxptr]
              mov     ax,word ptr es:[si].ntpage + 2
              mov     bx,word ptr es:[si].ntpage
              inc     es:[si].ntitem
              mov     cx,es:[si].ntitem
              call    getpage
              jc      ndxfrx
              call    setndxbl
              jc      ndxfrx
              cmp     es:[di].nbused,cx
              jbe     ndxfr10
              jc      ndxfr7
              mov     ax,cx
              mov     cx,es:[di].nbused
              sub     cx,ax
              inc     cx
              push    dx
              push    es
              mov     es,dx
              mul     es:[ndxelen]
              add     di,ax
              add     di,offset nbdata
              pop     es
              pop     dx
              jmp     ndxfr2
ndxfr11:      xor     cx,cx
              xor     dx,dx
              mov     ax,0ff00h
              jmp     short ndxfrx
ndxfr12:      mov     cx,ax
              mov     dx,bx
              xor     ax,ax
ndxfrx:       pop     es
              pop     di
              pop     si
              pop     dx
              pop     cx
              pop     bx
```

TABLE 1-continued

Source Code Listings
Copyright © 1993 Borland International

```
              ret
;
ndxtop:       push    bx
              push    si
              push    di
              push    es
              mov     [ndxaddr],bx
              mov     dx,[bx].ibuffer
              call    getrootbegin
ndxto1:       jc      ndxtox
              jz      ndxto11
              cmp     es:[di].nbused,0
              jz      ndxto11
              mov     ax,word ptr es:[di].nbdata + 2
              mov     bx,word ptr es:[di].nbdata
              or      bx,bx
              jnz     ndxto2
              or      ax,ax
              jz      ndxto3
ndxto2:       call    stepdownleft
              jmp     short ndxto1
ndxto3:       mov     ax,word ptr es:[di].nbdata + 6
              mov     bx,word ptr es:[di].nbdata + 4
              or      bx,bx
              jnz     ndxto12
              or      ax,ax
              jnz     ndxto12
ndxro11:      xor     cx,cx
              xor     dx,dx
              mov     ax,0ff00h
              jmp     short ndxtox
ndxto12:      mov     cx,ax
              mov     dx,bx
              xor     ax,ax
ndxtox:       pop     es
              pop     di
              pop     si
              pop     bx
              ret
;
ndxbottom:
              push    bx
              push    si
              push    di
              push    es
              mov     [ndxaddr],bx
              mov     dx,[bx].ibuffer
              call    getrootend
ndxbo1:       jc      ndxbox
              jz      ndxbo11
              mov     bx,es:[di].nbused
              or      bx,bx
              jz      ndxbo11
              push    dx
              push    es
              muv     es,dx
              mov     ax,es:[ndxelen]
              mul     bx
              mov     bx,ax
              pop     es
              pop     dx
              lea     si,[di + bx].nbdata
              mov     ax,word ptr es:[si + 2]
              mov     bx,word ptr es:[si]
              or      bx,bx
              jnz     ndxbo2
              or      ax,ax
              jz      ndxbo3
ndxbo2:       call    stepdownright
              jmp     short ndxbo1
ndxbo3:       push    es
              mov     es,dx
              mov     bx,es:[ndxptr]
              dec     es:[bx].ntitem
              mov     cx,es:[bx].ntitem
              mov     ax,es:[ndxelen]
              pop     es
              cmp     cx,0ffffh
              jz      ndxbo11
              sub     si,ax
              mov     ax,word ptr es:[si + 6]
              mov     bx,word ptr es:[si + 4]
              or      bx,bx
              jnz     ndxbo12
              or      ax,ax
              jnz     ndxbo12
ndxbo11:      xor     cx,cx
              xor     dx,dx
              mov     ax,0ff00h
              jmp     short ndxbox
ndxbo12:      mov     cx,ax
              mov     dx,bx
              xor     ax,ax
ndxbox:       pop     es
              pop     di
              pop     si
              pop     bx
              ret
;
ndxnext:      push    bx
              push    si
              push    di
              push    es
              mov     [ndxaddr],bx
              mov     dx,[bx].ibuffer
              call    prepvalue
ndxne0:       mov     es,dx
              mov     si,es:[ndxptr]
              mov     ax,word ptr es:[si].ntpage + 2
              mov     bx,word ptr es:[si].ntpage
              inc     es:[si].ntitem
              mov     cx,es:[si].ntitem
              call    getpage
              jnc     ndxne0a
              jmp     ndxnex
ndxde0a:      call    setndxtbl
              jnc     ndxne0b
              jmp     ndxnex
ndxne0b:      cmp     es:[di].nbused,cx
              jnc     ndxne2
ndxne1:       mov     es:[di].nbcntr,1
              mov     es,dx
              cmp     es:[ndxhigh],0
              jz      ndxne11
              dec     es:[ndxhigh]
              sub     es:[ndxptr],8
              jmp     short ndxne0
ndxne2:       push    dx
              push    es
              mov     es,dx
              mov     ax,es:[ndxelen]
              mul     cx
              mov     bx,ax
              pop     es
              pop     dx
              lea     si,[di + bx].nbdata
ndxne3:       mov     ax,word ptr es:[si + 2]
              mov     bx,word ptr es:[si]
              or      bx,bx
              jnz     ndxne4
              or      ax,ax
              jz      ndxne5
ndxne4:       call    stepdownleft
              jz      ndxne11
              jc      ndxnex
              lea     si,[di].nbdata
              jmp     short ndxne3
ndxne5:       cmp     cx,es:[di].nbused
              jz      ndxne1
              mov     ax,word ptr es:[si + 6]
              mov     bx,word ptr es:[si + 4]
              or      bx,bx
```

TABLE 1-continued

Source Code Listings
Copyright © 1993 Borland International

```
           jnz      ndxne6
           or       ax,ax
           jz       ndxne11
ndxne6:    test     [uniflag],1
           jnz      ndxne7
           test     [uniflag],2
           jnz      ndxne8
           jmp      short ndxne12
ndxne7:    push     di
           mov      di,si
           call     [ndxcmpr]
           pop      di
           jnz      ndxne12
           jmp      ndxne0
ndxne8:    push     di
           mov      di,si
           call     [ndxcmpr]
           pop      di
           jz       ndxne12
ndxne11:   xor      cx,cx
           xor      dx,dx
           mov      ax,0ff00h
           jmp      short ndxnex
ndxne12:   mov      cx,ax
           mov      dx,bx
           xor      ax,ax
ndxnex:    pop      es
           pop      di
           pop      si
           pop      bx
           ret
;
ndxprev:   push     bx
           push     si
           push     di
           push     es
           mov      [ndxaddr],bx
           mov      dx,[bx].ibuffer
           call     prepvalue
ndxpr0:    mov      es,dx
           mov      si,es:[ndxptr]
           mov      ax,word ptr es:[si].ntpage + 2
           mov      bx,word ptr es:[si].ntpage
           dec      es:[si].ntitem
           mov      cx,es:[si].ntitem
           call     getpage
           jnc      ndxpr0a
           jmp      ndxprx
ndxpr0a:   call     setndxtbl
           jnc      ndxpr0b
           jmp      ndxprx
ndxpr0b:   cmp      cx,0ffffh
           jnz      ndxpr2
ndxpr1:    mov      es:[di].nbcntr,1
           mov      es,dx
           cmp      es:[ndxhigh],0
           jz       ndxpr11
           dec      es:[ndxhigh]
           sub      es:[ndxptr],8
           jmp      short ndxpr0
ndxpr2:    push     dx
           push     es
           mov      es,dx
           mov      ax,es:[ndxelen]
           mul      cx
           mov      bx,ax
           pop      es
           pop      dx
           lea      si,[di + bx].nbdata
ndxpr3:    mov      ax,word ptr es:[si + 2]
           mov      bx,word ptr es:[si]
           or       bx,bx
           jnz      ndxpr4
           or       ax,ax
           jz       ndxpr5
ndxpr4:    call     stepdownright
           jz       ndxpr11
           jc       ndxprx
           mov      cx,es:[di].nbused
           jmp      short ndxpr2
ndxpr5:    cmp      cx,es:[di].nbused
           jz       ndxpr0
           mov      ax,word ptr es:[si + 6]
           mov      bx,word ptr es:[si + 4]
           or       bx,bx
           jnz      ndxpr6
           or       ax,ax
           jz       ndxpr11
ndxpr6:    test     [uniflag],1
           jnz      ndxpr7
           test     [uniflag],2
           jnz      ndxpr8
           jmp      short ndxpr12
ndxpr7:    push     di
           mov      di,si
           call     [ndxcmpr]
           pop      di
           jnz      ndxpr12
           jmp      ndxpr0
ndxpr8:    push     di
           mov      di,si
           call     [ndxcmpr]
           pop      di
           jz       ndxpr12
ndxpr11:   xor      cx,cx
           xor      dx,dx
           mov      ax,0ffh
           jmp      short ndxprx
ndxpr12:   mov      cx,ax
           mov      dx,bx
           xor      ax,ax
ndxprx:    pop      es
           pop      di
           pop      si
           pop      bx
           ret
;
checkequal:                  ;checks is es:di contains only equal
                             entries (ZR if true)
           push     ax
           push     bx
           push     cx
           push     si
           push     di
           push     ds
           mov      ds,dx
           mov      ax,ds:[ndxilen]
           mov      bx,ds:[ndxelen]
           push     es
           pop      ds
           add      di,offset nbdata + 8
           mov      si,di
           mov      cx,es:[nbused]
           cmp      cx,1
           jbe      chkeqx
           dec      cx
           cld
           test     ax,1
           jz       chkeq2
chkeq1:    add      si,bx
           push     cx
           push     si
           push     di
           mov      cx,ax
           rep      cmpsb
           pop      di
           pop      si
           pop      cx
           jne      chkeqx
           loop     chkeq1
           jmp      short chkeqx
chkeq2:    shr      ax,1
```

TABLE 1-continued

Source Code Listings
Copyright © 1993 Borland International

```
chkeq3:     add     si,bx
            push    cx
            push    si
            push    di
            mov     cx,ax
            rep     cmpsw
            pop     di
            pop     si
            pop     cx
            jne     chkeqx
            loop    chkeq3
chkeqx:     pop     ds
            pop     di
            pop     si
            pop     cx
            pop     bx
            pop     ax
            ret
;
include     db3ndx1.inc
;
db3proc2    endp
db3         ends
            end
```

What is claimed is:

1. In a computer system, a method for accessing data stored in a variety of formats, the method comprising:

providing an interface for receiving client requests for access to data stored in a variety of formats;

providing a plurality of drivers for accessing data stored in a variety of formats, each driver including method steps providing native access to a data file of a particular format, said plurality of drivers including a subset of one or more drivers that support a particular operation;

receiving at said interface a request for access to a particular data file;

in response to said request for access, successively invoking each of said drivers until a particular driver is located which includes method steps providing native access to said particular data file;

accessing said particular data file using said method steps providing native access to said particular data file;

receiving at said interface a request to perform said particular operation on said particular data file; and if said particular driver does not support said particular operation on said particular data file, passing said request to perform said particular operation to one of said subset of drivers that support said particular operation.

2. The method of claim 1, wherein said interface includes a database client interface and wherein said particular data file includes an electronic spreadsheet file.

3. The method of claim 1, wherein said interface includes an electronic spreadsheet interface and wherein, said particular data file includes an electronic database file.

4. The method of claim 1, wherein said method steps providing native access to said particular data file includes steps for opening the data file.

5. The method of claim 4, wherein said steps for opening the data file includes steps for opening the data file in a shared access mode, so that the data file can be accessed concurrently among multiple clients.

6. The method of claim 1, wherein said method steps providing native access to said particular data file include steps for retrieving a particular data record from the data file.

7. The method of claim 1, wherein said method steps providing native access to said particular data file includes steps for locking at least a portion of the data file, so that said data access includes exclusive access to at least a portion of the data file.

8. The method of claim 1, further comprising:

receiving at said interface another request for access to another data file, said another data file being stored in a format different from that of said particular data file;

successively invoking each of said drivers until a particular driver is located which includes method steps providing native access to said another data file; and accessing said another data file using said method steps providing native access to said another data file.

9. The method of claim 8, further comprising:

while the particular data file and said another data file are being accessed, receiving a request at the interface for performing a join operation on the data file; and using said drivers for accessing individual files of each data file for joining the two data files, so that data files of different formats can be joined.

10. The method of claim 1, further comprising:

providing a default driver including method steps providing native access to a data file of a generic format; and wherein said method further comprises:

if a particular driver cannot be located which includes method steps providing native access to said particular data file, accessing said particular data file using said default driver.

11. In a data processing system, a method for accessing data objects of unknown type stored at a remote system, the method comprising:

providing at a local client an interface for requesting access to data objects;

storing a plurality of drivers for accessing remote data objects, each driver including knowledge of how to communicate with a remote system and including knowledge of how to access the data objects stored at the remote system, said plurality of drivers including a default driver;

receiving at the interface a request for access to a particular data object which is stored at a particular remote system;

invoking each driver in turn until a particular driver indicates that it is able to successfully communicate with the particular remote system and it is able to access the particular data object which is stored at the particular remote system;

providing access to the particular data object using said particular driver;

receiving at the interface a request to perform a particular operation on the particular data object; and if said particular driver does not support said particular operation on the particular data object, passing said request to perform said particular operation to said default driver.

12. The method of claim 11, wherein said remote system includes a remote computer system connected to said computer system through a telecommunication network.

13. The method of claim 11, wherein said data access includes shared access with data integrity maintained.

14. The method of claim 11, wherein said data access includes exclusive access.

15. The method of claim 11, wherein said particular data object comprises a spreadsheet data file and wherein said invoking step comprises:

invoking each driver until a driver is invoked which is able to access a spreadsheet data file correctly.

16. In a computer system, a method for providing data access to data objects with dynamically-loaded drivers, the method comprising:

receiving a request for access to a data object of interest;

communicating the request for access to a driver manager;

until a driver is found which provides appropriate access to the data object of interest, loading by the driver manager each driver in turn and attempting to access the data object with the driver;

if no driver is found which provides appropriate access to the data object of interest, loading a default driver for providing access to the data object of interest;

providing access to the data object of interest with the driver which is loaded for providing access to the data object of interest;

receiving a request to perform a particular operation on the data object of interest, the particular operation being supported by a subset of one or more of said dynamically loaded drivers; and if the driver which is loaded for providing access to the data object of interest does not support the particular operation on the data object, performing the particular operation on the data object of interest with one of said subset of drivers that support the particular operation on the data object.

17. The method of claim 16, further comprising:

providing a data base engine with core services for accessing data objects of a variety of types;

registering call backs to said core services with the loaded driver; and accessing the data object of interest by calling back into said core surfaces for data access operations which are not supported by the loaded driver.

18. The method of claim 16, wherein said dynamically-loaded drivers include selected ones of a spreadsheet file driver and a database file driver.

19. The method of claim 18, wherein said particular data object is a spreadsheet file and wherein only said spreadsheet file driver remains loaded during access to the data object of interest.

20. The method of claim 16, wherein said dynamically-loaded driver includes a spreadsheet file driver, the driver including functionality for processing spreadsheet data files selected from Quattro Pro, Lotus 1-2-3, and Microsoft Excel data files.

21. The method of claim 16, wherein said data access includes access operations for information retrieval, storage, and sorting.

22. The method of claim 16, further comprising:

unloading the dynamically-loaded driver after access to the data object of interest ceases.

23. The method of claim 16, wherein each driver includes functionality sufficient for providing access to a particular type of data object without employing said data object.

24. The method of claim 16, further comprising:

receiving a request for access to another data object of interest while said data object of interest is being accessed; and until a driver is found which provides appropriate access to said another data object of interest, loading each driver in turn and attempting to access said another data object with the driver.

25. The method of claim 24, wherein said data object of interest and said another data object of interest are different types of data objects.

26. The method of claim 16, wherein said subset of drivers that support the particular operation includes the default driver.

27. In a computer system, a method for providing format-independent access to different data objects, the method comprising:

providing a database interface and a default database file driver;

receiving at the interface a request for access to a particular data object, said particular data object comprising a spreadsheet data file;

passing said request for access to the particular data object to a spreadsheet data file driver, said spreadsheet data file including knowledge of how to access the spreadsheet data file;

receiving at the interface a request to perform a database sort operation on the particular data object;

attempting to sort the particular data object by passing the request to perform a database sort operation to the spreadsheet data file driver; and if said spreadsheet data file driver does not include knowledge of how to sort the spreadsheet data file, passing the request to perform a database sort operation to said default database driver.

28. The method of claim 27, wherein said request for access includes a dBASE-compatible command to open the spreadsheet data file, said spreadsheet data file being a Lotus 1-2-3 compatible spreadsheet data file, and wherein the request for sorting said spreadsheet data file includes a dBASE-compatible command which creates an index for sorting the spreadsheet data file by a particular field of the spreadsheet data file.

* * * * *